US008343619B2

(12) United States Patent  (10) Patent No.: US 8,343,619 B2
Gouda et al.  (45) Date of Patent: Jan. 1, 2013

(54) OPTICAL WAVEGUIDE FILM

(75) Inventors: Wataru Gouda, Otsu (JP); Shunichi Osada, Otsu (JP); Masatoshi Oyama, Otsu (JP)

(73) Assignee: Toray Industries, Inc., Tokyo (JP)

( * ) Notice: Subject to any disclaimer, the term of this patent is extended or adjusted under 35 U.S.C. 154(b) by 756 days.

(21) Appl. No.: 12/440,886

(22) PCT Filed: Sep. 12, 2007

(86) PCT No.: PCT/JP2007/067702
§ 371 (c)(1),
(2), (4) Date: Mar. 11, 2009

(87) PCT Pub. No.: WO2008/032724
PCT Pub. Date: Mar. 20, 2008

(65) Prior Publication Data
US 2009/0252940 A1 Oct. 8, 2009

(30) Foreign Application Priority Data

Sep. 14, 2006 (JP) .................. 2006-249037
Oct. 11, 2006 (JP) .................. 2006-277311

(51) Int. Cl.
*B32B 7/02* (2006.01)
*G02B 6/10* (2006.01)
(52) U.S. Cl. ........ 428/213; 385/130; 385/142; 385/143; 385/144; 385/145
(58) Field of Classification Search .................. None
See application file for complete search history.

(56) References Cited

U.S. PATENT DOCUMENTS

| 5,546,493 | A * | 8/1996 | Noguchi et al. | 385/125 |
| 6,360,047 | B1 * | 3/2002 | Nekado et al. | 385/129 |
| 2003/0223714 | A1 * | 12/2003 | Conrad et al. | 385/114 |

FOREIGN PATENT DOCUMENTS

| JP | 8-095016 A | 4/1996 |
| JP | 10-034761 A | 2/1998 |

(Continued)

OTHER PUBLICATIONS

JP2006-221145 Machine Translation. Retrieved Aug. 17, 2011.*

(Continued)

*Primary Examiner* — Maria Veronica Ewald
*Assistant Examiner* — Prashant J Khatri
(74) *Attorney, Agent, or Firm* — RatnerPrestia

(57) ABSTRACT

An optical waveguide film is provided having a cross-sectional structure wherein claddings composed of a thermoplastic resin B and dispersions (cores) composed of a thermoplastic resin A extend in the machine direction of the film and are arrayed in the transverse direction of the film, the optical waveguide film comprising not less than 3 cores, diameters (We1, We2) of cores located at the both ends in the transverse direction of the film and diameter (Wc) of a core in the central portion in the transverse direction of the film satisfying the following Formulae (1) and (2), the optical waveguide film comprising a continuous cladding layer at at least one side thereof, the thicknesses of the cladding layers (Te1, Te2) at the both ends thereof in the transverse direction of the film and the thickness (Tc) of the cladding layer in the central portion in the transverse direction of the film satisfying the following Formulae (3) and (4):

$0.8 \leq We1/Wc \leq 1.2$  Formula (1)

$0.8 \leq We2/Wc \leq 1.2$  Formula (2)

$0.8 \leq Te1/Tc \leq 1.2$  Formula (3)

$0.8 \leq Te2/Tc \leq 1.2$  Formula (4).

18 Claims, 16 Drawing Sheets

FOREIGN PATENT DOCUMENTS

| | | |
|---|---|---|
| JP | 2002-48955 A | 2/2002 |
| JP | 2004-029087 A | 1/2004 |
| JP | 2004-133183 A | 4/2004 |
| JP | 2005-187639 A | 7/2005 |
| JP | 2006-003622 A | 1/2006 |
| JP | 2006-023376 A | 1/2006 |
| JP | 2006-221145 A | 8/2006 |

OTHER PUBLICATIONS

Machine translation of JP2006-221145. Retrieved Sep. 29, 2011.*
International Search Report dated Oct. 16, 2007, application No. PCT/JP2007/067702.

* cited by examiner

Fig. 1
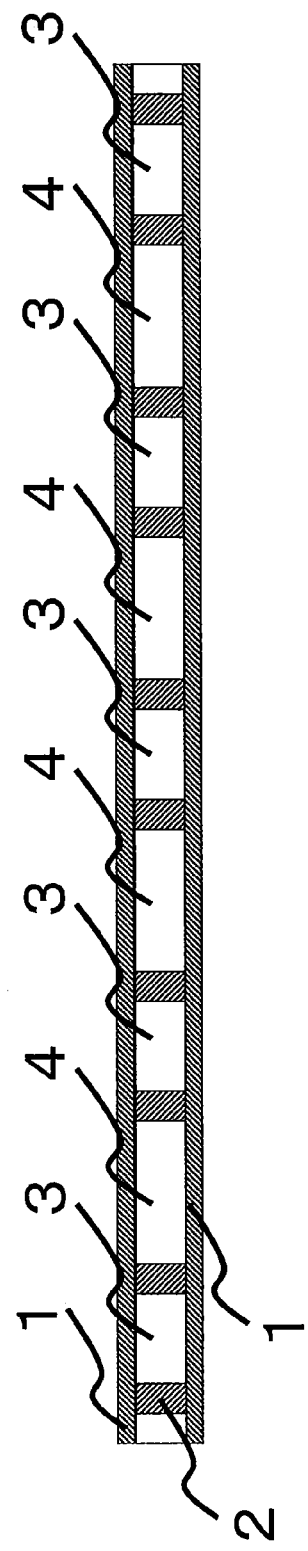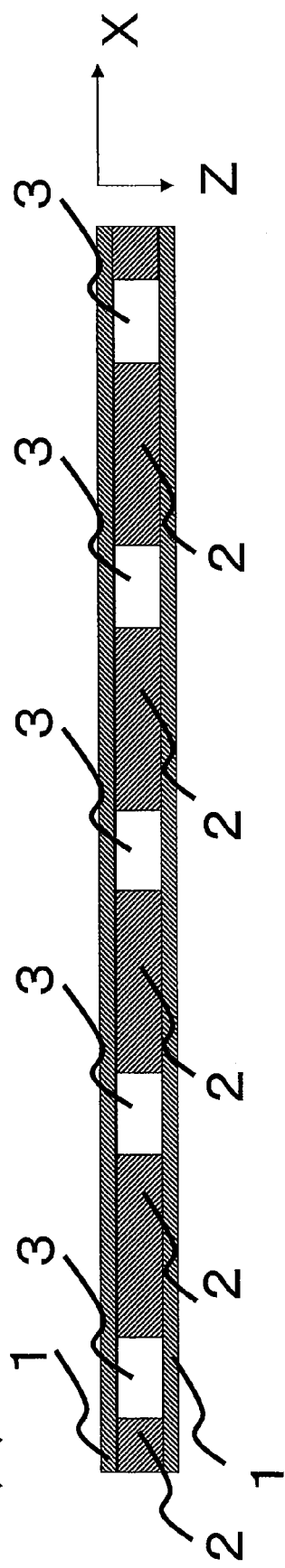

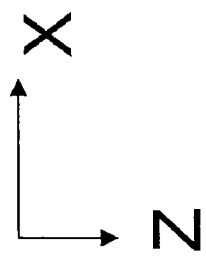
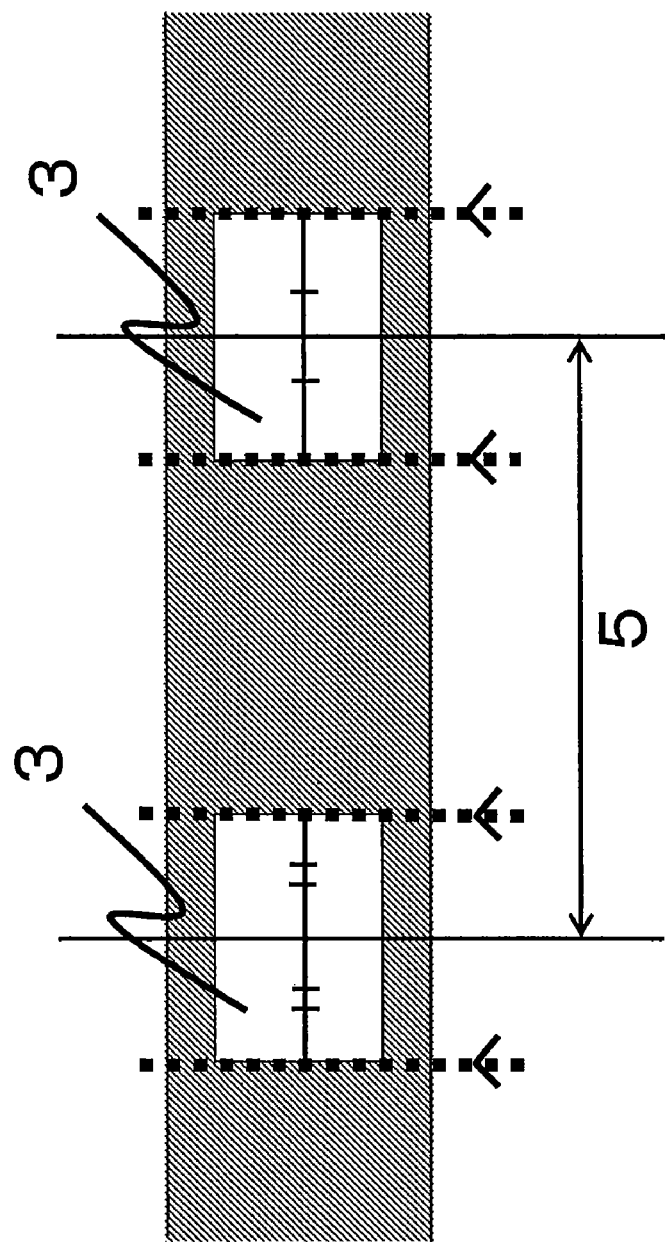
Fig. 4

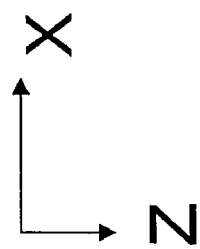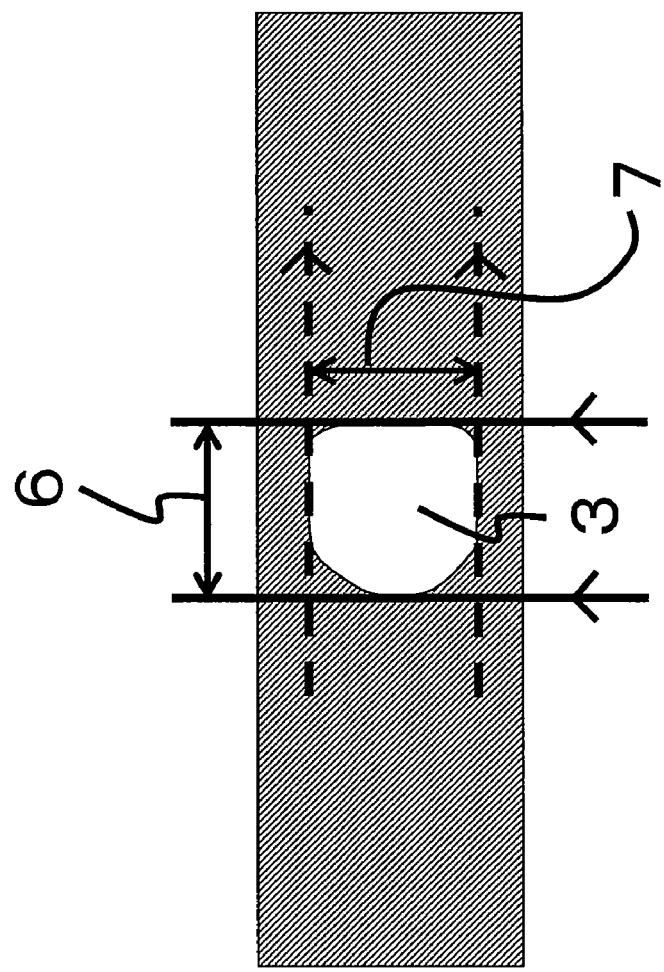
Fig. 5

[Elevation View]

[Cross-Sectional View]

OPTICAL WAVEGUIDE FILM

This application is a U.S. National Phase Application of PCT International Application No. PCT/JP2007/067702, filed Sep. 12, 2007, which claims priority to Japanese Patent Application No. 2006-249037, filed Sep. 14, 2006 and Japanese Patent Application No. 2006-277311, filed Oct. 11, 2006, the contents of such applications being incorporated by reference herein in their entirety.

TECHNICAL FIELD

The present invention relates to a resin film having lightguides, a production apparatus thereof and to a production process thereof.

BACKGROUND OF THE INVENTION

In recent years, with the drastic increase in the communication traffic due to the prevailing of Internet, the communication is now being replaced to optical communication by which data transmission in with large capacity can be attained at a high speed from the conventional communication using metal wiring with which the information amount in communication is limited. Optical communication has advantages over the conventional communication through electric wiring in that broadband is available and that it is not influenced by noise. As examples of optical communication, Japanese communication makers are now constructing FTTH (fiber to the home) network in which quartz-based optical fibers reach homes, and European automobile companies are now developing MOSTCO (The Media Oriented Systems Transport Corporation) which is a standard of on-vehicle LAN using plastic optical fibers. In addition to this long distance to middle distance communications, for the middle to short distance communications, the inter-apparatus and intra-apparatus interconnections between domestic computers, electronic switching systems and the like are also now replaced to optical interconnections using optical fibers or sheet-like optical waveguides from the present communications using wire harness. Above all, as a material for the optical interconnection between boards, in a board, between chips and in a chip, flexible polymer optical waveguides made into a resin film are now gathering hope.

In such a trend to proceed optical wirings, polymer optical waveguides and plastic optical fiber sheets which are inexpensive and have good ease of handling, not the quartz-based single mode optical fibers which are expensive and have poor ease of handling, are drawing attention. For example, a method for producing an optical waveguide sheet by compression molding of a laminate in which a core sheet is sandwiched between a pair of cladding sheets has been proposed (JP 2001-281484 A). However, by such a method, the core layer and the cladding layers deform to constitute waveguides, and since stress or orientation is suffered among the molecules at the deformed site and vicinity thereof, anisotropy of refractive index is generated, so that dispersion of the propagating light is large, and information transmission with a high density is likely to be difficult, which is problematic. Further, since the core layer is continuous in directions other than the direction of travel of light, light is likely to leak.

A method for obtaining an flexible embedded type optical waveguide has also been proposed wherein on a Cu—Si substrate, 1) a under-cladding layer and a core layer are formed successively; 2) cores serving as waveguides are formed by photolithography and dry etching; 3) the resultant is covered with a upper-cladding layer; and 4) the substrate is peeled off (JP 08-304650 A). In this case, since the optical loss is reduced to some degree when compared with the former, since a vacuum process, spin coat, photolithography, dry etching and the like are necessary, only a batch process can be employed, so that the cost is high, which is problematic. Moreover, it is difficult to obtain a film having a long size or a large area. Further, it is difficult to form cores whose cross-sectional shape is one other than rectangular, the optical loss is high when compared with the circular or oval cores. Still further, since the core layer is formed by the spin coat method, there are cases where the optical loss due to the roughness of the interface is in an unacceptable level. In addition thereto, a method wherein selective polymerization, reactive ion etching (RIE) and photolithography are combined (JP 2004-206016 A), direct exposure method (JP 2003-185860 A), a method based on injection molding (JP 2003-172841 A), and photo-bleaching method (JP 2004-012635 A) and the like are known. However, any of these methods has a problem in that the number of steps is too many, so that the production time is long, production cost is high, and production yield is low. Further, since the cores and cladding constituting the polymer optical waveguides are formed by utilizing a reaction phenomenon of photo or thermal hardening resin, it is also difficult to produce a film having a large surface area and long size.

On the other hand, as a production method of a plastic optical fiber sheet (also called fiber ribbon), a method is known wherein a plurality of optical fibers are passed through guide rings arrayed at prescribed intervals and unifying the resultant with an adhesive (JP 60-178405 A). As a method for producing sheet-like lightguides in which the peripheries of the composites serving as lightguides are fused and covered with a resin or the like, a method of using a die has also been proposed wherein each of the fiber arrays is molded in a batch (JP 04-043304 A). However, by the former production process of optical fiber sheet, it is difficult to accurately position and array the optical fibers, so that the production yield and high cost are problematic. On the other hand, by the latter production process, there is a problem in that it is difficult to array the cores keeping the shape of all of the cores in the transverse direction of the film, and the variation in the shape of the obtained core is large. There is also a problem in that since a fluorine-containing resin is used in a large amount for forming the cladding walls connecting between core and adjacent core, the cost is high, and the low self-supporting property of the fluorine-containing resin itself is also problematic. That is, there is a problem in that since it is difficult to keep the state wherein the cores are arrayed linearly and uniformly in the transverse direction of the film (since it is difficult to adjust the position of the cores), optical interconnection is difficult.

On the other hand, the present inventors have proposed an optical waveguide film in which a plurality of cores is arrayed by using a melt extrusion process (JP 2004-205834 A). By this method, although an optical waveguide film with which the loss is low and which has a large area and long size is easily obtained, there is a task to reduce the variation in the optical waveguide performances among the cores.

DETAILED DESCRIPTION OF THE INVENTION

Exemplary embodiments of the present invention overcome one or more of these problems and provide an optical waveguide film which can be produced at a low cost, which is easy to have a large area and a long size, in which the shape of a plurality of cores is uniform and the cores are linearly and equidistantly arrayed in the transverse direction of the film, with which optical loss and variation in the optical waveguide performance among the cores is small, and/or which has a self-supporting property. The optical waveguide film is optionally suited for short, middle and long distances such as inter-apparatus communication and inter-board communication in an apparatus and inter-chip communication on a board.

An optical waveguide film is provided having a cross-sectional structure wherein cladding composed of a thermoplastic resin B and dispersions (cores) composed of a thermoplastic resin A extend in the machine direction of the film and are arrayed in the transverse direction of the film, the optical waveguide film comprising not less than 3 cores, diameters (We1, We2) of cores located at the both ends in the transverse direction of the film and diameter (Wc) of a core in the central portion in the transverse direction of the film satisfying the following Formulae (1) and (2), the optical waveguide film comprising a continuous cladding layer in at least one surface thereof, the thicknesses of the cladding layers (Te1, Te2) at the both ends thereof in the transverse direction of the film and the thickness (Tc) of the cladding layer in the central portion in the transverse direction of the film satisfying the following Formulae (3) and (4):

$$0.8 \leq We1/Wc \leq 1.2 \quad \text{Formula (1)}$$

$$0.8 \leq We2/Wc \leq 1.2 \quad \text{Formula (2)}$$

$$0.8 \leq Te1/Tc \leq 1.2 \quad \text{Formula (3)}$$

$$0.8 \leq Te2/Tc \leq 1.2 \quad \text{Formula (4)}.$$

According to aspects of the present invention, an optical waveguide film which can be produced at a low cost, which is easy to have a large area and a long size, in which the shape of a plurality of cores is uniform and the cores are linearly and equidistantly arrayed in the transverse direction of the film, with which optical loss and variation in the optical waveguide performance among the cores is small, and/or which has a self-supporting property can be provided. The optical waveguide film is optionally suited for short, middle and long distances such as inter-apparatus communication and inter-board communication in an apparatus and inter-chip communication on a board.

BRIEF DESCRIPTION OF THE DRAWINGS

FIG. 1 is a cross-sectional view showing an example of the transverse direction-thickness direction of an exemplary embodiment of the optical waveguide film.

FIG. 4 is a view for explaining the core interval between adjacent cores according to an exemplary embodiment.

FIG. 5 is a view for explaining the core diameter according to an exemplary embodiment.

DESCRIPTION OF SYMBOLS

Figure 2:
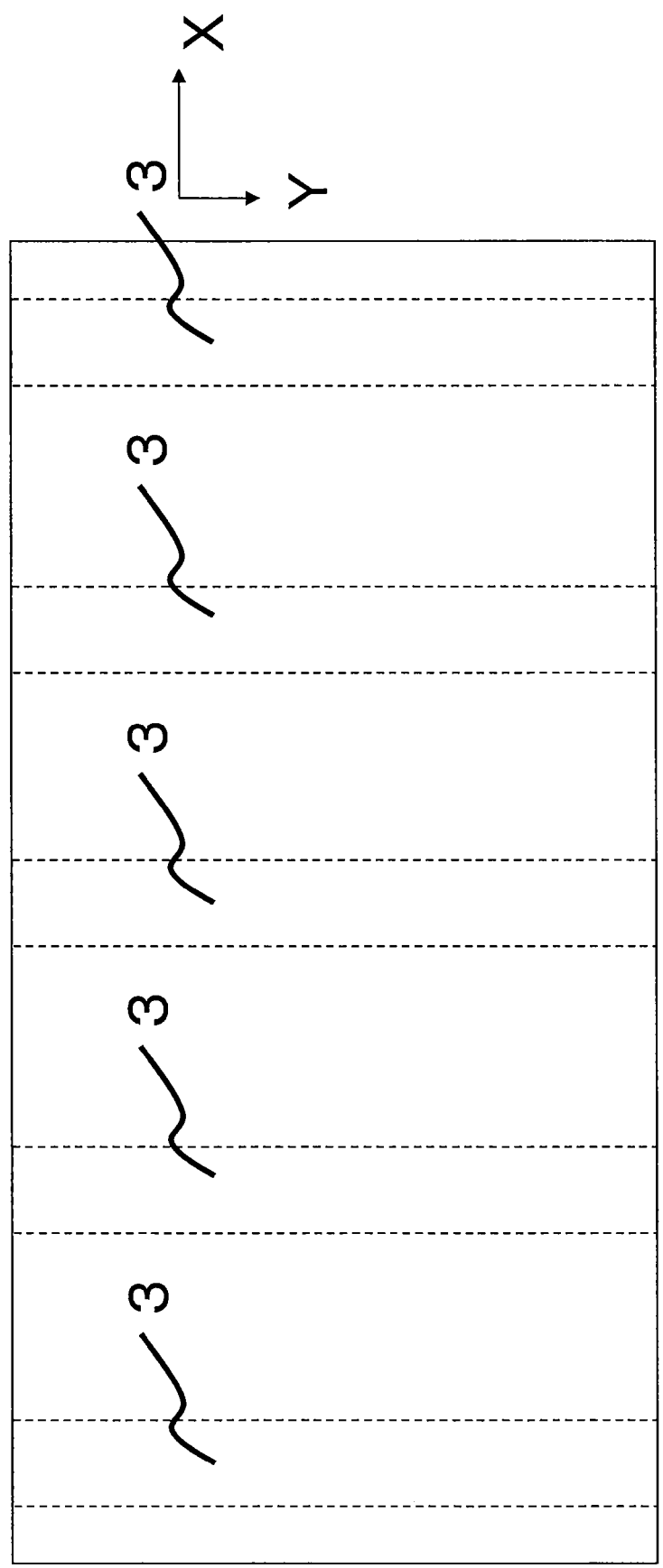
FIG. 2 is a top view showing the optical waveguide film of FIG. 1.

1: cladding layer
2: cladding wall
3: core
4: core interval-adjusting portion
5: core interval
6: interval (core diameter) between two parallel lines in the thickness direction (Z) of the film, which lines contact the core
7: interval between two parallel lines in the transverse direction (X) of the film, which lines contact the core
8: core interval-adjusting portion having a length in the transverse direction of the film of not less than 10 mm
9: irregularities
10: side plate
11: resin A-supplying section
12: slit section
13: resin B-supplying section
14: side plate
15: feedblock
16: resin inlet
17: liquid pool
18: outlet
19a, 19b: slits
20: lower end of edge line at the top of each slit
21: upper end of edge line at the top of each slit
22: edge of slit
23: lower end
24: upper end
25: edge line of slit
26: liquid pool
27: direction of liquid flow
28: liquid pool
29: inlet
30: inlet
31: discharge outlet
32: junction
33: compositing apparatus
34: single die
35: slit-forming member located at the center of the slit plate
36: slit-forming member located at the terminal
37: angle formed by the central slit-forming member and the terminal slit-forming member
38: multimanifold die
39: width of the outlet of a comb type feedblock (width of the polymer inlet of a multimanifold die)
40: width between the both wall surfaces of the slit plate
41: width of the polymer discharge outlet of a multimanifold die

42: slit length of the longest slit in the slit section
43: distance from the polymer inlet of a comb type feedblock to the polymer discharge outlet of a manifold type die
44: sites at which the film is to be cut off The optical waveguide film according to exemplary embodiments of the present invention has at least two types of thermoplastic resins, that is, a thermoplastic resin A constituting the cores and a thermoplastic resin B constituting the cladding. Examples of the thermoplastic resins include polymethylmethacrylate (refractive index n is 1.49, "n" herein represents refractive index) and copolymers (n=1.47-1.50) comprising methyl methacrylate as a major component; polystyrene (n=1.58) and copolymers (n=1.50-1.58) comprising styrene as a major component; polyethylene (n=1.51-1.54); polypropylene (n=1.47-1.52); polylactic acid (n=1.47); norbornene-based alicyclic polyolefines (n=1.51-1.53) and copolymers thereof; styrene-acrylonitrile copolymers (n=1.56); poly 4-methylpentene 1 (n=1.46-1.47); polyvinyl alcohol (n=1.49-1.53); ethylene/vinyl acetate copolymers (n=1.46-1.50); nylon 6, 11, 12 and 66 (n=1.53); polycarbonate (n=1.50-1.57); polyethylene terephthalate (n=1.58-1.68); polyethylene terephthalate copolymers (n=1.54-1.66); fluorene-copolymerized polyethylene terephthalate (n=1.6-1.66); polyethylene naphthalate (n=1.65-1.81); poly chlorostyrene (n=1.61); polyvinylidene chloride (n=1.63); polyvinyl acetate (n=1.47); ternary copolymers or quaternary copolymers (n=1.50-1.58) of methyl methacrylate/styrene, vinyltoluene or α-methylstyrene/maleic anhydride; polydimethylsiloxane (n=1.40); polyacetal (n=1.48); polyether sulfone (n=1.65-1.66); polyphenylene sulfide (n=1.6-1.70); polyimides (n=1.56-1.60); fluorinated polyimides (n=1.51-1.57); polytetrafluoroethylene (n=1.35); polyvinylidene fluoride (n=1.42); polytrifluoroethylene (n=1.40); perfluoropropylene (n=1.34); tetrafluoroethylene-perfluoroalkyl vinyl ether copolymers (n=1.36-1.4); tetrafluoroethylene-hexafluoropropylene copolymers (n=1.36-1.4); tetrafluoroethylene-ethylene copolymers (n=1.36-1.4); polychlorotrifluoroethylene and binary or ternary copolymers (n=1.35-1.40) of these ethylene fluoride; blend polymers (n=1.42-1.46) of polyvinylidene fluoride and polymethylmethacrylate; copolymers (n=1.31-1.34) between polymer (n=1.34) of $CF_2\!=\!CF\!-\!O\!-\!(CF_2)_x\!-\!CF\!=\!CF_2$ monomer and ethylene fluoride; copolymers (n=1.31-1.34) between polymer (n=1.31) of $CF_2\!=\!CF\!-\!O\!-\!(CF_2)\!-\!O\!-\!CF\!=\!CF_2$ monomer and ethylene fluoride; copolymers comprising as a major component the fluorinated methacrylate represented by the general formula $CH_2\!=\!C(CH_3)COORf$ wherein the group Rf is $(CH_2)n(CF_2)_nH$ (n=1.37-1.42), Rf is $(CH_2)_m(CF_2)_nF$ (n=1.37-1.40), Rf is $CH.(CF_3)_2$ (n=1.38), Rf is $C(CF_3)_3$ (n=1.36), Rf is $CH_2CF_2CHFCF_3$ (n=1.40) or Rf is $CH_2CF(CF_3)_2$ (n=1.37), and copolymers (n=1.36-1.40) of these fluorinated methacrylates, and copolymers (n=1.37-1.43) between such a fluorinated methacrylate and methyl methacrylate; polymers comprising as a major component the fluorinated acrylate represented by the general formula $CH_2\!=\!CH.COOR'f$, wherein Rf' is $(CH_2)_m(CF_2)_nF$ (n=1.37-1.40), Rf' is $(CH_2)_m(CF_2)_nH$ (n=1.37-1.41), Rf' is $CH_2CF_2CHF.CF_3$ (n=1.41), Rf' is $CH(CH_3)_2$ (n=1.38), fluorinated acrylate copolymers (n=1.36-1.41) thereof, copolymers (n=1.36-1.41) between such a fluorinated acrylate and the above-described fluorinated methacrylate, and copolymers (n=1.37-1.43) between such a fluorinated acrylate, fluorinated methacrylate and methyl methacrylate; polymers comprising as a major component a 2-fluoroacrylate represented by the general formula $CH_2\!=\!CF.COOR''f$ and copolymers (n=1.37-1.42) thereof (wherein R''f represents $CH_3$, $(CH_2)_m(CF_2)_nF$, $(CH_2)_m(CF_2)_nH$, $CH_2CF_2CHFCF_3$ or $C(CF_3)_3$). Representative examples of the fluorinated polymethacrylate include fluorine-containing polymethylmethacrylate copolymers (n=1.38-1.42) such as 1,1,1,2,3,3-hexafluorobutyl methacrylate polymer, trifluoroethylmethacrylate polymer, hexafluoropropyl methacrylate polymer and fluoroalkyl methacrylate polymer.

Among these, from the viewpoint of strength, heat resistance, transparency and low propagation loss, more preferred are polycarbonate; polymethylmethacrylate; metallocene; cyclic olefin copolymers which are copolymers between norbornene and ethylene copolymerized by a Ziegler-Natta catalyst; cyclic polyolefins obtained by ring-opening metathesis polymerization of a norbornene-based monomer and hydrogenation; polyimide resins; poly(4-methylpentene-1); polyethylene terephthalate; polystyrene; and fluorinated polymers. Further, to reduce the optical loss, it is more preferred that the hydrogen atoms in the polymer be deuterated.

These resins may be a homopolymer, copolymer or a blend of two or more polymers. Further, to the resin, various additives such as an antioxidant, antistatic agent, nucleus agent, inorganic particles, organic particles, viscosity-reducing agent, thermal stabilizer, lubricant, infrared absorber, UV absorber and a doping agent for adjusting refractive index may be added.

If 90 wt % or more of the optical waveguide film is composed of the thermoplastic resins, since a surface processing such as working with a diamond knife or heat compression processing can be easily performed, the optical interconnection between apparatuses, in a apparatus, between boards and between chips on a board can be attained more easily, so that a low cost optical information transmission system can be provided.

The optical waveguide film according to an exemplary embodiment of the present invention comprises not less than 3 cores. The number of cores is preferably not less than 8, more preferably not less than 16, still more preferably not less than 32. The number of cores is preferably one represented by $2^n$ (n is a natural number of not less than 2) from the viewpoint of using the film for information communication. The more the number of cores, the higher the density of wiring by which communication with multi-channel can be attained, and the higher the effect of the optical transmission. Although the upper limit of the number of cores is not restricted, the number of cores is preferably not more than 2000 in order to keep the practical characteristics.

In an exemplary embodiment of the present invention, it is preferred that the directions of the not less than 3 cores (direction of travel of light) be substantially parallel to each other, and that the positions of the centers of the not less than 3 cores be substantially parallel to the film surface. That is, it is preferred that the cores be linearly arrayed at regular intervals in the transverse direction of the film. In such a case, high density wiring can be attained and control of input-output of light is easy, so that the time of optical interconnection can be largely reduced. The definition of the position of the core is as described in JPCA-PE02-05-02S (2007).

A representative shape of the optical waveguide film is shown in FIGS. 1 and 2. FIG. 1 is a cross-sectional view of the transverse direction (X)-thickness direction (Z) of the optical waveguide film. FIG. 2 is a view of the transverse direction (X)-machine direction (direction of travel of light) (Y) of the optical waveguide film. In FIG. 1(a), there are cladding layers 1 at the both surfaces, and there are cladding walls 2, cores 3 and core interval-adjusting portions 4 in the central portion. The light travels in the direction of Y shown in FIG. 2. Usually, it is preferred that the cladding layers 1 and the cladding walls 2 be made of the same material. It is also preferred to form the cores 3 and the core interval-adjusting portions 4 with the same material because of ease of production, but different materials may also be used. In cases where the core interval-adjusting portions are included, the core interval-adjusting portions are not regarded as the cores even if the core interval-adjusting portions are made of the same material as the cores because the aspect ratio of the thickness direction to the transverse direction is too large, so that the propagation performance is too poor and they do not satisfy the performance as the cores. On the other hand, FIG. 1(*b*) is a cross-sectional view of an optical waveguide film wherein there are cladding layers 1 at the both surfaces, and there are only cladding walls 2 and cores 3.

In the optical waveguide film according to an exemplary embodiment of the present invention, the diameters (We1, We2) of the cores located at the both ends in the transverse direction of the film and the diameter (Wc) of the core in the central portion in the transverse direction of the film satisfy the following Formulae (1) and (2), the optical waveguide film has a continuous cladding layer(s) at least one side thereof, and the thicknesses of the cladding layer (Te1, Te2) at the both ends thereof in the transverse direction of the film and the thickness (Tc) of the cladding layer in the central portion in the transverse direction of the film satisfy the following Formulae (3) and (4):

$$0.8 \leq We1/Wc \leq 1.2 \quad \text{Formula (1)}$$

$$0.8 \leq We2/Wc \leq 1.2 \quad \text{Formula (2)}$$

$$0.8 \leq Te1/Tc \leq 1.2 \quad \text{Formula (3)}$$

$$0.8 \leq Te2/Tc \leq 1.2 \quad \text{Formula (4)}.$$

The cores located at the both ends in the transverse direction of the film are the core at the right end and the core at the left end in FIG. 1. The core diameter referred to herein means the maximum core size in the X direction in the X-Z cross-section. That is, in FIG. 5, the core diameter corresponds to the interval 6 between two parallel lines in the Z direction which lines contact the core. The core located in the central portion of the transverse direction of the film means the core located at the center in FIG. 1, and is defined as the core which is closest to the center of the line connecting the cores located at both ends. In cases where there are two cores in the central portion, one of them is selected.

If Formulae (1) and (2) are satisfied, the alignment accuracy of the cores and the dimensional accuracy of the core diameters are very high, so that the variation in the optical waveguide performance is small. Further, control of input-output of light is easy, so that the time of optical interconnection can be largely reduced. Still further, since the waveguide alignment accuracy is also promoted, the optical coupling loss can be reduced. Preferably, Formulae (8) and (9) are satisfied. In such a case, the optical waveguide performances of the respective cores are about the same.

$$0.9 \leq We1/Wc \leq 1.1 \quad \text{Formula (8)}$$

$$0.9 \leq We2/Wc \leq 1.1 \quad \text{Formula (9)}$$

In an exemplary embodiment of the present invention, the optical waveguide film comprises a continuous cladding layer at least one side thereof. The continuous cladding layer corresponds to the cladding layers 1 in FIG. 1. The thicknesses (Te1, Te2) of the cladding layer at the both ends in the transverse direction of the film are defined as the thicknesses of the regions of the cladding layer at any one surface, which regions contact the cores at the both ends, respectively. Similarly, the thickness (Tc) of the cladding layer in the central portion in the transverse direction of the film is defined as the thickness of the region contacting the core located at the central portion in the transverse direction of the film. The thicknesses of the cladding layer at the both ends and at the central portion are compared at the same side. The thickness of the cladding layer is not the total of the thicknesses of the cladding layer 1 and the cladding wall 2. The thickness of the cladding layer is determined by measuring the length of the perpendicular extending from the surface of the film to the boundary (the boundary extending to the X direction) between the core and the cladding layer.

If Formulae (3) and (4) are satisfied, dimensional accuracy of the core diameter is high, so that the variation in the optical waveguide performance is small. More preferably, Formulae (10) and (11) are satisfied. In this case, the optical waveguide performances of the respective cores are about the same.

$$0.9 \leq Te1/Tc \leq 1.1 \quad \text{Formula (10)}$$

$$0.9 \leq Te2/Tc \leq 1.1 \quad \text{Formula (11)}$$

In embodiments of the present invention, it is preferred to use a lamination technique as a method for arraying the not less than 3 cores in the transverse direction. Examples of the lamination technique include a method wherein a multimanifold type feedblock which is a known lamination apparatus and a square mixer are used; and a method wherein a feedblock of comb type alone is used. The multimanifold type feedblock is the known feedblock as described in Keiji SAWADA "Newest Technology in Extrusion Molding of Plastics" (Rubber Digest) (1993). That is, before feeding a plurality of resins to the main body of the die, the resins are joined in a feedblock; the resins are then fed to the single manifold section of the die; then the flow is widened in the transverse direction of the film and extruded in the form of a sheet. It should be noted that although the direction of lamination and the direction of the width of the lip (X direction) of the die are perpendicular in the conventional lamination in the thickness direction, they are parallel in the lamination in the transverse direction as in an exemplary embodiment of the present invention. By the extrusion in such a relationship, lamination in the transverse direction of the film is realized, and the cores, core interval-adjusting portions and the cladding walls can be alternately arrayed.

Square mixer is a known tube body in which a polymer passage is divided into two passages having a tetragonal cross section, which has a junction at which the divided polymer flows are again laminated vertically. By repeating this step, a laminate having a number of layers can be obtained. For example, if a tri-layered laminate composed of two types of resins having a structure of B/A/B is subjected to once division/joining, it is converted to a penta-layered laminate. The number of layers obtained by using a square mixer is expressed as $[\{(\text{number of initial layers}-1) \times 2\}$ to the power of n$]+1$, wherein "n" means the times of repeat of the one division/joining. As for the distribution ratio in a square mixer, since the polymer is usually divided by the passages having the same cross-sectional area in the same amount, the laminates having the same structure are periodically formed. Thus, when a multimanifold type feedblock and a square mixer are combined, for example, if a laminate in the melted state having 9 layers laminated with the multimanifold type feedblock passes through the square mixer 4 times, a laminate having 143 layers wherein the cores, core interval-adjusting portions and the cladding walls are arrayed in the transverse direction can be obtained. Examples of a method for further increasing the number of layers include a method wherein a plurality of feedblocks are arranged in parallel; and a method wherein the number of laminated layers obtained in the feedblock is increased by increasing the number of passing through the square mixer. An example of the multimanifold type feedblock is the type II feedblock described in JP 2006-44212 A. Since the number of layers and the number of cores are closely related, the number of laminated layers is preferably at least 17 layers from the viewpoint of amount of information. From the viewpoint of increasing the number of channels and the amount of information, the number of layers is preferably not less than 65, more preferably not less than 129, still more preferably not less than 257.

However, if the number of laminated layers is increased using the above-described manifold type feedblock, the size of the apparatus is enlarged. Further, since the polymer is passed through the square mixer for a plurality of times, it is difficult to obtain a film laminated in the transverse direction maintaining high lamination accuracy. Therefore, in the optical waveguide film of an exemplary embodiment of the present invention, it is preferred to obtain a laminate using a comb type feedblock (hereinafter referred to as "feedblock") having a number of thin slits. The details of this feedblock are described in JP 2005-352237 A. With this feedblock, lamination of up to 400 layers in the transverse direction can be easily attained by increasing the number of slits, and the laminate can be formed at once. Cores in the number of up to about 200 can be formed at once.

The cladding layers 1 constituting the surface layers can be formed by covering the upper and lower surfaces in the thickness direction of the above-described laminate in the melted state with the thermoplastic resin from which the cladding layers 1 are to be formed using a known compositing apparatus (called pinol) or a multi-manifold die such that the laminate is sandwiched between the thermoplastic resin for constituting the cladding layers 1.

In an exemplary embodiment of the present invention, the variation (R) in the core diameters is preferably not less than 0.001% and not more than 20%. The variation in the core diameters is determined by accurately measuring the diameter of all cores arrayed in the transverse direction of the film in the optical waveguide film, and calculation according to Formula (13).

$$\text{Wave} = \sum_{k=1}^{n} W(k)/n \quad \text{Formula (12)}$$

$$R = (W\text{max} - W\text{min})/\text{Wave} \quad \text{Formula (13)}$$

R: variation (%) in core diameters
Wave: average (μm) of core diameter
W(k): diameter of the kth core
n: number of cores contained in the optical waveguide film
Wmax: the maximum value of the core diameter
Wmin: the minimum value of the core diameter In cases where the variation (R) in the core diameters is not less than 0.001% and less than 20%, since the dimensional accuracy is high, the variation in the optical waveguide performances among the cores is small. More preferably, the variation (R) in the core diameters is not less than 0.001% and less than 10%. Still more preferably, the variation (R) in the core diameters is not less than 0.001% and less than 5% in order to substantially eliminate the variation in the optical waveguide performances among the cores.

The core diameter in the optical waveguide film of an exemplary embodiment of the present invention is preferably not less than 1 μm and not more than 3000 μm, more preferably not less than 2 μm and not more than 2000 μm, still more preferably not less than 3 μm and not more than 150 μm. If the core diameter is larger than 3000 μm, not only the film is not flexible because it is too thick, but also the optical loss is too large, so that it is not preferred. If the core diameter is not less than 2 μm and not more than 2000 μm, impingement of the light from an optical fiber or a surface emission-type laser is easier, the propagation loss is small, and the flexibility is sufficient, so that it is preferred. Further, if the core diameter is not less than 3 μm and less than 1000 μm, since the waveguide diameter is sufficiently small and so the number of modes is restricted, the film is more easily applied to communications in the broad band which is preferred in the middle or long distance transmission. Although it depends on the wavelength used in the communication, it is preferred to employ a core diameter of not less than 20 μm and not more than 1000 μm for multimode, and to employ a core diameter of not less than 3 μm and not more than 20 μm for single mode. The shape of the cross-section of the cores in the optical waveguide film of the present invention may be any geometrical figure such as circle, ellipse, polygonal shape, square or trapezoid. In view of the fact that mode dispersion and optical loss depending on the core shape occur in the information and communication uses, a figure having a symmetry about the center of the core as high as possible is preferred, and the most preferred shape is circular. The symmetry includes line symmetry and point symmetry.

If the cores arrayed substantially in parallel with the surface of the optical waveguide film in the transverse direction (X)-thickness direction (Z) section exist in a number of not less than 3 and not more than 300 per a length of 1 cm in the transverse direction, communication with a large capacity can be attained, so that it is preferred. If the number is less than 3, the density of the optical waveguide is too low and is ineffective. If the number is more than 300, the diameter of the cores is so small that connection may be difficult or the noise due to light leakage may occur because the thickness of the claddings is too small, so that it is not preferred. If the number of cores per a length of 1 cm in the transverse direction of the film is not less than 8 and not more than 100, the efficiency of the optical waveguides is high and data transmission of a larger capacity can be attained, so that it is preferred.

Figure 3:
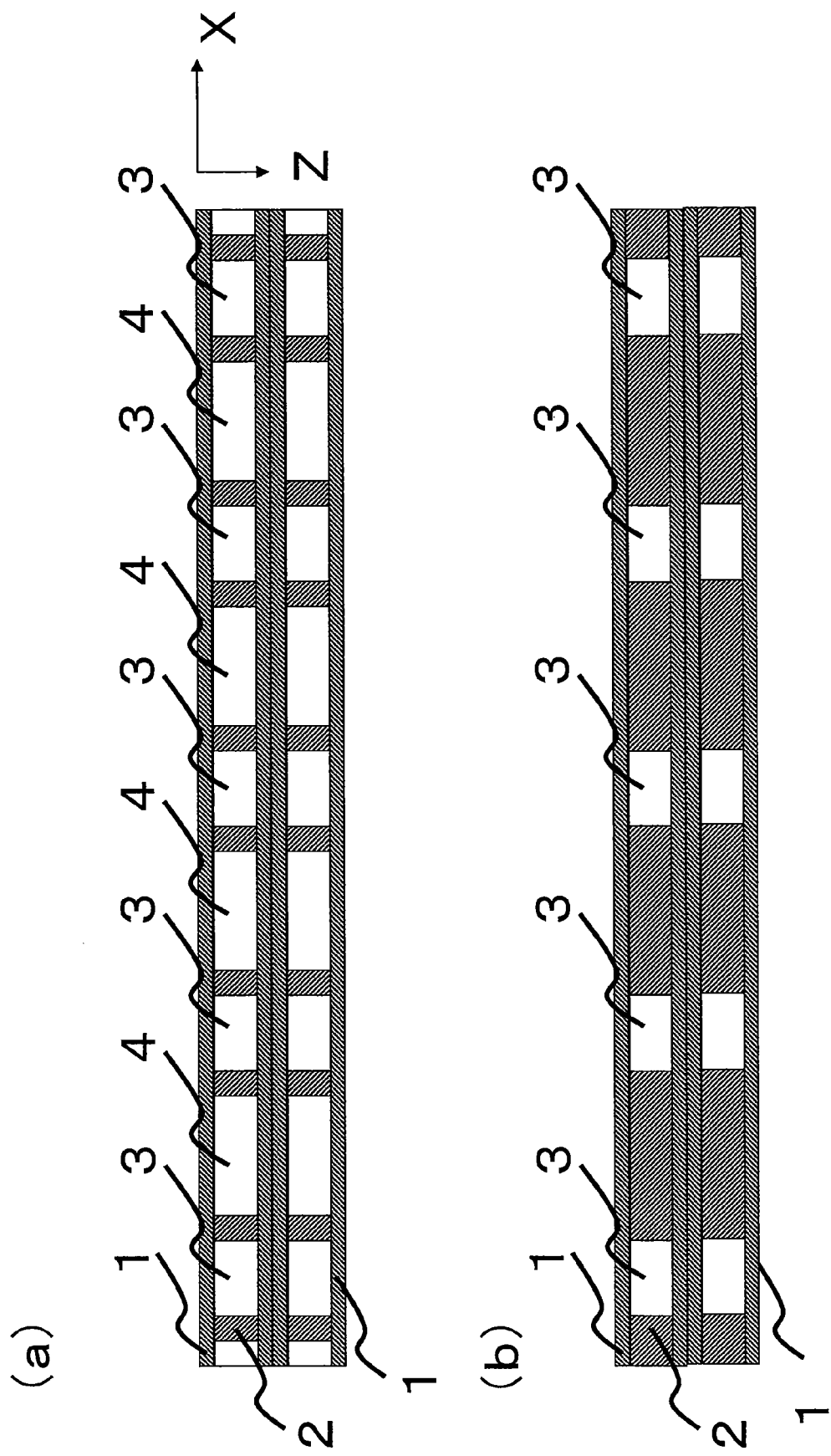
FIG. 3 is an example of the cross section of an exemplary embodiment of an optical waveguide film wherein two core groups are arrayed in substantially parallel with the film surface.

In accordance with aspects of the present invention, if there are two or more core groups arranged substantially in parallel with the film surface in the transverse direction-thickness direction cross section, the number of channels can be increased with a small area, so that it is preferred. The term "core group" herein means a group of not less than 3 cores arrayed at substantially regular intervals and substantially in parallel with the film surface in the transverse direction-thickness direction cross section. An optical waveguide film wherein 2 core groups shown in FIG. 1 are arranged substantially in parallel with the film surface is shown in FIG. 3. The one having the core interval-adjusting portions is shown in (a), and the one which does not have the core interval-adjusting portions is shown in (b). In cases where the optical waveguide film is produced by the etching method or the like, for stacking the cores in order to increase the number of channels, the number of steps is increased very much so that the cost thereof is high and is not practical. In an exemplary embodiment of the present invention, because of the unusual method, it can be attained in one step, so that the optical waveguide film can be produced with high accuracy at a very low cost. For example, it can be attained by using two or more comb type feedblocks having slits or square mixers.

The optical waveguide film according to an exemplary embodiment of the present invention preferably has a cladding layer with a thickness of not less than 5 μm and not more than 500 μm at one or both sides thereof. The thickness of not less than 5 μm and not more than 500 μm does not include the thickness of the cladding wall. This layer may not necessarily form the outermost layer, but a layer composed of another resin may be formed as the outermost layer. If the cladding layer having a thickness of not less than 5 μm and not more than 500 μm exist on one or both sides, even if scratches or the like are formed in the surface, since the cores are not substantially influenced, the loss due to the scratches or the like in the surface is low, so that it is preferred. More preferably, the thickness is not less than 15 μm and not more than 100 μm. If the thickness is not less than 15 μm and not more than 100 μm, the flexibility and ease of handling are promoted, and light receiving/emitting elements such as a surface-emitting laser and photodetector, or electric circuits of electronic parts may be formed and mounted on the surface. The core diameter, cladding wall diameter and the thickness of the cladding layer in the optical waveguide film of the present invention can be measured using an image of the cross section of the optical waveguide film taken with a light microscope or electron microscope appropriately adjusting the magnification within a range between ×5 and ×1000, with which they can be observed sufficiently to three significant figures.

In the optical waveguide film according to exemplary embodiments of the present invention, it is preferred that at least 4 consecutive adjacent cores satisfying the relationship between the cross-sectional area (Ac) of the core located at the central portion in the transverse direction of the film and the cross-sectional area (A) of an arbitrary core arrayed in the transverse direction of the film defined in Formula (5) below exist. The number of such cores is preferably not less than 8, more preferably not less than 16, most preferably not less than 32.

$$0.8 \leq A/Ac \leq 1.2 \quad \text{Formula (5)}$$

If Formula (5) is satisfied, since the dimensional accuracy is very high, the variation in the optical waveguide performances is decreased. If the value is more than 1.2 or less than 0.8, since the variation in the cross-sectional areas of the cores is large, it is difficult to attain a similar optical waveguide performance in all of the consecutive cores. More preferably, Formula (14) is satisfied. In such a case, there is little difference between the optical waveguide performances of the cores.

$$0.9 \leq A/Ac \leq 1.1 \quad \text{Formula (14)}$$

To carry out data transmission with a large capacity, since at least two cores for the respective two-way transmission and reception, that is, totally at least four cores are provided, it is preferred that not less than 4 consecutive cores satisfying Formula (5).

In the optical waveguide film according to an exemplary embodiment of the present invention, the variation in the cross-sectional areas along the machine direction of the film of the cores is preferably not less than 5%. If the variation in the cross-sectional areas along the machine direction of the film of the cores is not more than 5%, the waveform of the transmitted data is not disturbed; accurate data transmission can be attained. The variation is more preferably not more than 3%, still more preferably not more than 1%. The "variation in the cross-sectional areas along the machine direction of the film of the cores" is determined by measuring the cross-sectional area of one core at 10 points with an interval of 10 cm along the machine direction of the film, and calculation based on the average value thereof. That is, the variation in the cross-sectional areas of the cores is calculated by dividing the difference between the maximum cross-sectional area and the minimum cross-sectional area of the core by the average, and multiplying the resultant by 100.

To reduce the variation in the machine direction of the film, it is preferred to employ resins having low melt viscosity as a thermoplastic resin A with which the cores are to be formed and as a thermoplastic resin B with which the claddings are to be formed. By using resins having low melt viscosity, the stress at the interface between the polymer and the wall surface is small and the disturbance in the thickness direction is reduced, so that the variation in the cross-sectional areas of the cores along the machine direction of the film is reduced. From the viewpoint of landing stability of the optical waveguide film on the cast, the draft ratio which is the value obtained by dividing the distance between the lips of the die by the film thickness is preferably not more than 20, more preferably not more than 10, still more preferably not more than 5.

The optical waveguide film produced by this production process has a high alignment accuracy of core intervals, which is indispensable to the optical coupling, and the shape of the cores is uniform. Variation (Vl) in core intervals, which is the variation in the distance between the centers of adjacent core is an index expressing the alignment accuracy of the core intervals. The term "core interval" herein means the distance between the center lines of the two parallel lines in the thickness direction (Z) of the film, which parallel lines contact the core. The variation (Vl) in the core intervals is defined according to the Formula (15) below.

$$Vl = (L\max - L\min)/Lc \times 100 (\%) \quad \text{Formula (15)}$$

Vl: variation in core intervals
Lmax: maximum core interval
Lmin: minimum core interval
Lc: interval between the cores located at the center and the core adjacent thereto Here, in cases where the number of the cores is an odd number, Lc is the average of the intervals between the core located at the center and each of the two cores adjacent thereto. In cases where the number of the cores is an even number, Lc is the distance between the centers of the two cores located at the center. If the variation in core intervals is not more than 30%, control of input-output of light is easy, so that the time of optical interconnection operation can be largely reduced. The smaller the variation in the core intervals, the better, and the core intervals is more preferably not more than 20%, still more preferably not more than 10%, most preferably not more than 5%.

The core/clad area ratio between the cores composed of the thermoplastic resin A and the claddings composed of the thermoplastic resin B used in the optical waveguide film according to an exemplary embodiment of the present invention is preferably not less than 0.5. The term "core/clad area ratio between the cores and the claddings" herein means the value obtained by dividing the area occupied by the thermoplastic resin A in the film thickness direction (Z)-transverse direction (X) cross section by the area occupied by the thermoplastic resin B. Here, the term "cores" means the region of the total of the cores and the core interval-adjusting portions, and the term "claddings" means the region of the total of the cladding walls and the cladding layers. If this ratio is less than 0.5, area in the cladding which does not pass the light is large, so that the thermoplastic resin A constituting the cores is not effectively used. Further, the self-supporting property is also degraded, so that the positioning of the cores may be difficult and optical coupling may be difficult. Therefore, the area ratio is more preferably not less than 1, still more preferably not less than 2. On the other hand, if the ratio of the cores composed of the thermoplastic resin A is too large, the optical waveguide film may be likely to be folded, or the optical coupling wherein light transfers to the adjacent core passing through the cladding wall may occur, the upper limit of the area ratio is preferably not more than 10. This ratio can be adjusted by adjusting the amounts of the thermoplastic resins A and B extruded from the extruder based on the density thereof.

Figure 6:
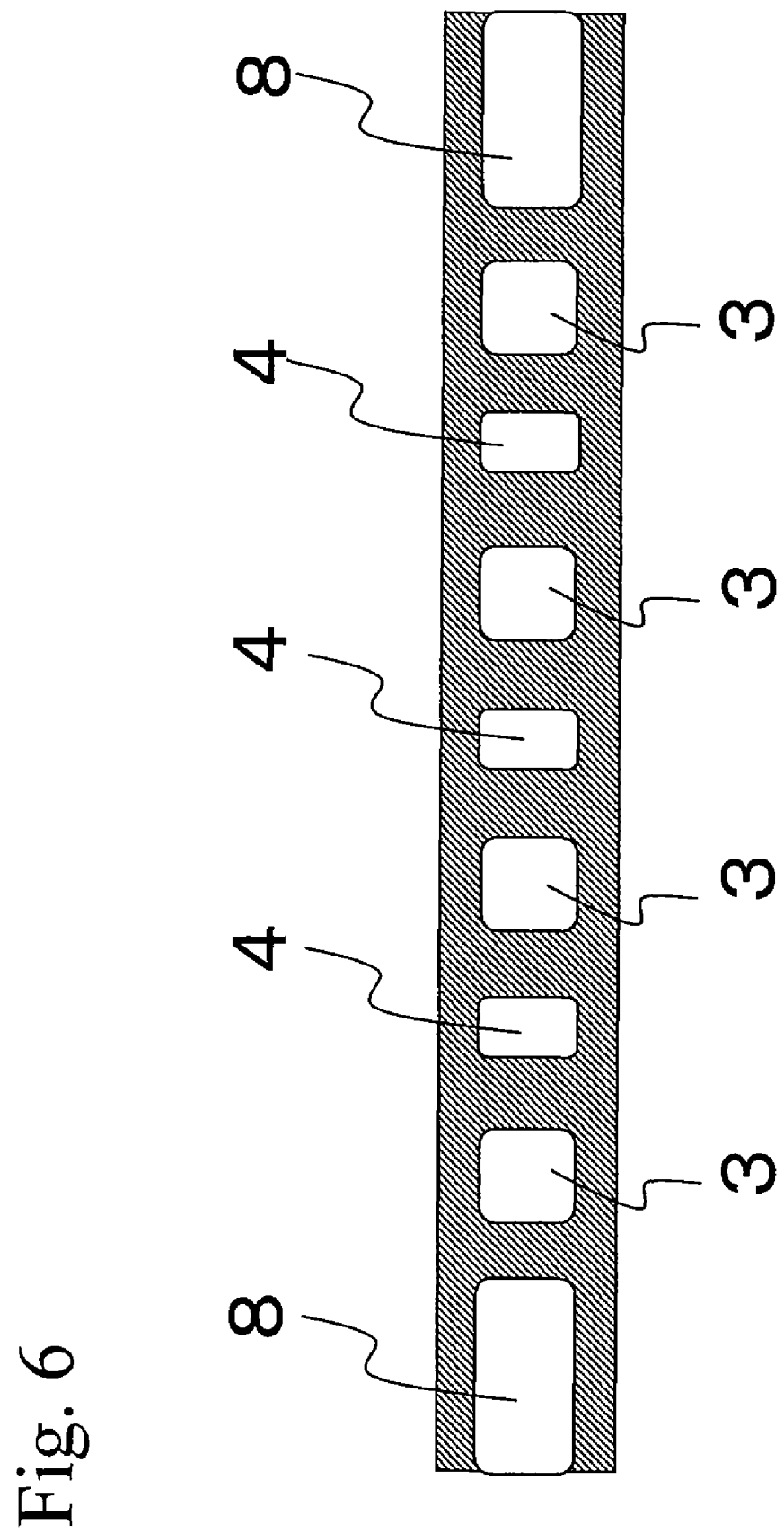
FIG. 6 is a cross-sectional view of an exemplary embodiment of an optical waveguide film comprising dispersions (core interval-adjusting portions) composed of thermoplastic resin A.

From the viewpoint of effectively using the thermoplastic resin A and increasing the stiffness of the film, the optical waveguide film according to an exemplary embodiment of the present invention preferably contains dispersions of the thermoplastic resin A constituting the core interval-adjusting portions. FIG. 1(a) shows an example of the cross-sectional view of the optical waveguide film containing the dispersions of the thermoplastic resin A constituting the core interval-adjusting portions. As shown in FIG. 1(a), the core interval-adjusting portions composed of the thermoplastic resin A extends along the machine direction of the film in the same manner as the cores. The diameter and the number of the core interval-adjusting portions are not restricted. Although it depends on the manner of use of the core interval-adjusting portions, the diameter of the core interval-adjusting portions is preferably different from the core diameter in order to distinguish the core interval-adjusting portions from the cores. By providing the core interval-adjusting portions, the thermoplastic resin A with which the cores are to be formed which is available more inexpensively than the claddings can be effectively used, and they can serve to adjust the distances between the cores. They may also be used for checking the light leakage from the optical waveguides, and further may be applied to optical communication in which the mode dispersion is not problematic. The number of the core interval-adjusting portions can be adjusted by the number of the slits in the slit plate, and the diameter of the core interval-adjusting portions can be adjusted by the length and width of the slits in the slit plate. The optical waveguide film according to an exemplary embodiment of the present invention preferably comprises one or more core interval-adjusting portions having a length in the transverse direction of the film of at least 10 mm. The term "length in the transverse direction of the film" means the interval 6 between the two parallel lines along the thickness direction of the film, which parallel lines contact the cores, as shown in FIG. 5. Further, the core interval-adjusting portions 8 having a length in the transverse direction of the film of not less than 10 mm are preferably provided at both ends in the transverse direction of the film, as shown in FIG. 6.

From the viewpoint of inhibiting deformation of the shape of cores in the inner side due to the neck down of the polymer in the form of a sheet extruded from the die by forming such core interval-adjusting portions at the both ends, the length of such core interval-adjusting portions is preferably not less than 20 mm, more preferably not less than 40 mm. Formation of the core interval-adjusting portions composed of the thermoplastic resin A at the both ends can be attained by employing the structure of the lamination apparatus wherein the thermoplastic resin A is flown to the slits at both ends in the slit plate. That is, it can be attained if the slit portions at the both ends are opened to the side of the manifold (liquid pool) of the thermoplastic resin A. Making the length in the transverse direction of the film of the core interval-adjusting portions be not less than 20 mm can be attained by widening the width or shortening the length of the slits so that Formula (16) below is satisfied.

Specifically, it is known that the relationship between the discharge rate of the resin flown into the slit and the pressure loss is expressed by the following Formula (16):

$$\Delta P = 12 \cdot L \cdot \mu / h / t^3 \cdot Q \qquad \text{Formula (16)}$$

($\Delta P$: pressure loss, L: length of slit, $\mu$: viscosity of resin, t: width of slit, h: depth of slit portion, Q: discharge rate)

Thus, since the flow rate can be easily changed by fixing the pressure loss, the core diameter, the diameter of the core interval-adjusting portions, and the cladding diameter can be arbitrarily controlled. On the other hand, the number can be adjusted by adjusting the number of the slits in the slit plate.

Figure 7:
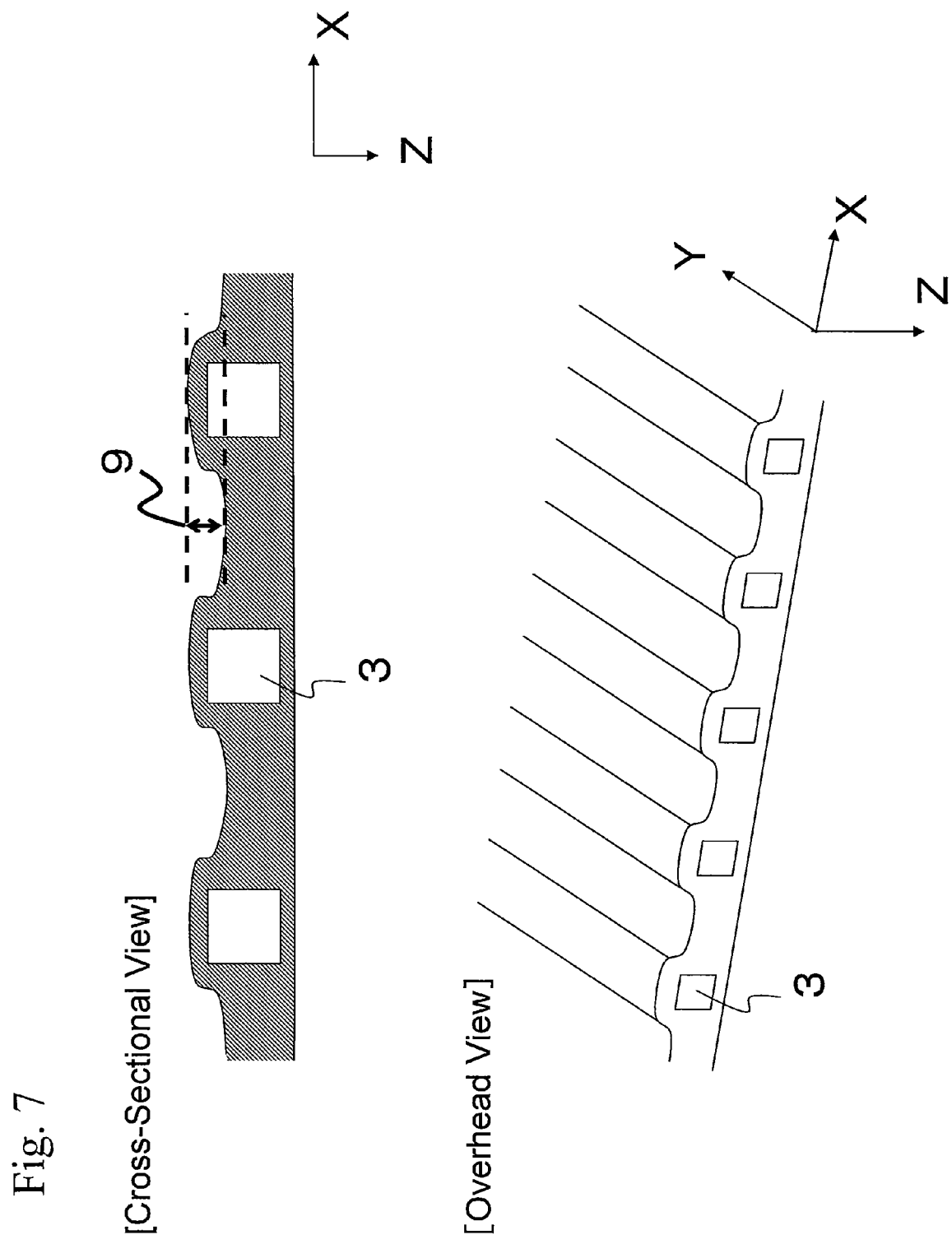
FIG. 7 shows an example of the cross-sectional view and general view of an embodiment of an optical waveguide film having a surface on which irregularities exist.

In the optical waveguide film according to an exemplary embodiment of the present invention, it is preferred that irregularities with a depth of not less than 10 μm exist in at least one film surface. This is schematically shown in FIG. 7. The irregularities exist in the form such that the cladding portions existing between the respective cores constitute the depressions, and the core portions constitute the protrusions due to the depression of the cladding portions located between the respective cores (the cladding wall portions at the depressed sites may be the core portions). The term "irregularity" herein means the difference between the maximum point and the minimum point in the adjacent peak and trough in the cladding layer, indicated by reference numeral 9 in FIG. 7. In this embodiment of the present invention, among the plurality of irregularities, the one located in the vicinity of the cores in the central portions is used. By using the irregularity as a guide in connecting the connector, accurate alignment can be attained. If the irregularity is less than 10 μm, it is difficult to use it as a guide when connecting the connector. Further, by using the depression as a guide when cutting the film, the film can be cut easily and accurately. The irregular structure may exist on the both sides of the film. This can be attained utilizing the differences in extrusion temperatures, viscoelasticity characteristics and the discharge rates between the cores and claddings. It is also preferred to employ an amorphous resin for constituting the cores and a crystalline resin having a high crystallization rate for constituting the claddings.

In an exemplary embodiment of the present invention, the difference |nb−na| between the refractive index nb of the claddings and the refractive index na of cores is preferably not less than 0.001. From the viewpoint of reflection conditions in the cores, nb<na. The difference is more preferably not less than 0.010, still more preferably not less than 0.030, most preferably not less than 0.06. If the difference is not less than 0.001, a preferred optical waveguide film is attained because total reflection occurs at the core/clad interfaces. If the difference is not less than 0.010, the adjustment of the incident axis of the light is easy and so interconnection is easy, so that it is preferred. Further, if the difference is not less than 0.030, false signals do not substantially occur due to the light leakage between channels, so that it is more preferred. If the difference is not less than 0.06, the optical loss due to bending is also reduced, so that it is most preferred. The combination of the preferred resins, by which a difference |nb−na| between the refractive indices of the cores and the claddings of not less than 0.001 is attained, may be arbitrarily selected from the combinations of the above-described resins.

More preferred examples of the combination of the resins include the following:

cladding: the above-described fluorinated polymer/core: polymethylmethacrylate or a copolymer thereof, cladding: polymethylmethacrylate/core: a copolymer containing polymethylmethacrylate as a major component,
cladding: polymethylmethacrylate/core: an alicyclic polyolefin or cyclic olefin copolymer,
cladding: an alicyclic polyolefin or polyolefin/core: an alicyclic polyolefin or cyclic olefin copolymer,
cladding: a polyethylene terephthalate copolymer/core: polyethylene terephthalate or a polyethylene terephthalate copolymer,
cladding: polyethylene terephthalate/core: polyethylene naphthalate or a polyethylene naphthalate copolymer,
cladding: a modified polycarbonate/core: polycarbonate,
cladding: polycarbonate/core: polyethylene terephthalate or a polyethylene terephthalate copolymer
cladding: a polyolefin/core: polycarbonate.
With these combinations, heat resistance and moisture resistance are excellent, and the productivity is also excellent, so that optical waveguide films can be provided at a low cost. It is more preferred that the cores comprise polymethylmethacrylate as the major component and the claddings comprise as the major component a thermoplastic resin having fluorine groups. In this case, the optical waveguide performance is excellent, and strength, heat resistance, ease of handling and the like are also practically excellent. In view of the film-forming property of the thermoplastic resin having fluorine groups and in view of the core shape, the melting point Tm is preferably not higher than 220° C., more preferably not higher than 150° C.

From the viewpoint of the fact that the film formation by the melt extrusion method can be attained, the thermoplastic resin having fluorine groups used in an exemplary embodiment the present invention is preferably a tetrafluoroethylene-ethylene copolymer. The term "tetrafluoroethylene-ethylene copolymer" herein means a copolymer constituted by a monomer composed of tetrafluoroethylene and ethylene; a monomer composed of chlorotrifluoroethylene and ethylene; a monomer composed of tetrafluoroethylene and vinylidene fluoride; or tetrafluoroethylene, vinylidene fluoride and hexafluoropropylene. The monomers may comprise a functional group selected from carboxyl group, carboxylate and the like. The thermoplastic resin having fluorine groups with which the claddings are to be formed in an exemplary embodiment of the present invention is preferably a tetrafluoroethylene-ethylene copolymer composed of a monomer containing 40 to 80 mol % of tetrafluoroethylene and 20 to 60 mol % of ethylene; or composed of a monomer containing 10 to 50 mol % of tetrafluoroethylene and 50 to 90 mol % of vinylidene fluoride. The melting point Tm of the tetrafluoroethylene-ethylene copolymer used according to an exemplary embodiment of the present invention is preferably not higher than 280° C., more preferably not higher than 240° C., still more preferably not higher than 220° C.

The haze value of the optical waveguide film according to an exemplary embodiment of the present invention is preferably not more than 5%, more preferably not more than 3% from the viewpoint of decreasing the optical loss. This may preferably be attained by employing cores having excellent transparency and employing a thermoplastic resin B having a crystallinity as low as possible and having an excellent transparency for forming the claddings. For example, in cases where the thermoplastic resin B with which the claddings are to be formed is a tetrafluoroethylene-ethylene copolymer, the copolymer is preferably one having a melting enthalpy of crystals ΔHm of not more than 30 J/g, more preferably not more than 20 J/g.

In the optical waveguide film according to an exemplary embodiment of the present invention, from the viewpoint of decreasing the bending loss, "NA" representing the square root of the difference between the square of the refractive index na of the thermoplastic resin A and the square of the refractive index nb of the thermoplastic resin B is preferably not less than 0.5, more preferably not less than 0.6. Examples of the combination include, but not limited to, polymethylmethacrylate having a refractive index of 1.49 as the thermoplastic resin A with which the cores are to be formed, and tetrafluoroethylene-ethylene copolymer having a refractive index of 1.40 as the thermoplastic resin B with which the claddings are to be formed; and a styrene-copolymerized polymethylmethacrylate having a refractive index of 1.54 as the thermoplastic resin A and polyvinylidene fluoride having a refractive index of 1.42 as the thermoplastic resin B. The "NA" means numerical aperture which is the value defined as the square root of the value obtained by subtracting the square of the refractive index of the claddings from the square of the refractive index of the cores. This can be attained by making the difference |nb−na| between the refractive indices of the claddings and the cores being not less than 0.09.

It is preferred that the melt viscosity of the cores composed of the thermoplastic resin A and the melt viscosity of the claddings composed of the thermoplastic resin B at the film-molding temperature in the melt film formation of the optical waveguide film according to an exemplary embodiment of the present invention simultaneously satisfy the relationship defined by the following Formulae (6) and (7):

$$\text{Melt Viscosity of Cores} \geq \text{Melt Viscosity of Claddings} \quad \text{Formula (6)}$$

$$\text{Melt Viscosity of Claddings} \leq 1000 (\text{Pa} \cdot \text{s}) \quad \text{Formula (7)}$$

In exemplary embodiments of the present invention, since it is beneficial that the claddings enclose the periphery of the respective cores, the rheological properties of the resins at the molding temperature in the film-forming process are taken into consideration. By simultaneously satisfying Formulae (6) and (7), the shape of a plurality of cores can easily be uniform and the cores can easily be linearly arrayed in the transverse direction of the film. The term "film-molding temperature" herein means the temperature conditions in the region from the extruder to the die. In case of a crystalline resin, the temperature is within the range of the melting point ±20° C.-50° C. The melt viscosity of the cores is preferably not more than 700 (Pa·s), more preferably not more than 400 (Pa·s). The difference between the melt viscosities of the cores and the claddings is preferably not more than 200 (Pa·s), more preferably not more than 100 (Pa·s). From the viewpoint of uniformity of the shape of the cores, it is preferred that the difference between the melt viscosities of the cores and claddings be as low as possible. The difference is preferably not more than 400 (Pa·s), more preferably not more than 200 (Pa·s).

From the viewpoint of carrying out accurate data transmission without being influenced by the service conditions, the optical waveguide film according to an exemplary embodiment of the present invention has a thermal contraction rate in the machine direction of the film after heat treatment at 100° C. for 24 hours of preferably not more than 5%, more preferably not more than 3%, still more preferably not more than 1%. To attain this, it is preferred to use a thermoplastic resin having a glass transition temperature of not lower than 100° C. for either one or for both of the cores and the claddings.

The optical waveguide film according to an exemplary embodiment of the present invention has a bending strength of not less than 5 N/mm and not more than 150 N/mm, more preferably not less than 15 N/mm and not more than 80 N/mm. If the bending strength is not more than 5 N/mm, since the self-supporting property is insufficient, the ease of handling may be poor or the film may be buckled during use, so that it is not preferred. If the bending strength is more than 150 N/mm, flexibility is deteriorated, which is not preferred. In contrast, if the bending strength is not less than 15 N/mm and not more than 80 N/mm, an optical waveguide film having an optimum ease of handling and flexibility is obtained. This may be attained by the selection of the optimum resins or by the stretching of the optical waveguide film as described below.

From the viewpoint of increasing the mechanical strength of the film, it is also preferred to uniaxially stretching the optical waveguide film in the machine direction of the film. The stretching may be carried out by stretching the non-oriented optical waveguide film at a temperature not lower than the glass transition temperature (Tg)+20° C. of the resin composition. The stretching is preferably carried out in the machine direction of the film. For example, in cases where the thermoplastic resin A with which the cores are to be formed is polymethylmethacrylate, although the stretching temperature and the stretching ratio are not restricted, usually, the stretching temperature is not lower than 100° C. and not higher than 200° C., and the stretching ratio is preferably not less than 1.2 times the original length and not more than 3 times the original length. The stretching in the machine direction is usually carried out utilizing the change in circumferential speeds between rolls. Then the stretched optical waveguide film is preferably subjected to relaxing heat treatment in an oven. This relaxing heat treatment is usually carried out at a temperature higher than the stretching temperature and lower than the melting point. In cases where the thermoplastic resin A is polymethylmethacrylate, the heat treatment is preferably carried out at a temperature between 100° C. and 200° C.

In the optical waveguide film according to an exemplary embodiment of the present invention, the outer surface of the each cladding layer may be covered with a protective layer made of another resin, for example, a polyamide, polyester elastomer, polyamide elastomer, polystyrene elastomer, polyolefin elastomer, poly-4-methylpentene-1, polyvinylidene fluoride, ionomer, ethylene/ethyl acrylate copolymer, ethylene/vinyl acetate copolymer, vinylidene fluoride copolymer, polymethylmethacrylate, polystyrene, ABS, polybutylene terephthalate, polyethylene, vinyl chloride or the like. By mixing carbon black, lead oxide, titanium oxide, organic pigment or the like to color the protective layer, light shading effect which prevents the leakage of the transmitted light in the inner side of the optical waveguide film to the outside, and which prevents the entering of external light into the inner side of the resin film can be promoted. Further, to prevent the deterioration of the resin constituting the protective layer or the resin constituting the cores and claddings, a UV absorber, HALS or the like may also be added.

Since the optical waveguide film of the present invention can optionally be produced by a continuous process, it may be wound into a roll, and roll-to-roll processing may be carried out when processing the film into an optical waveguide. Since the film is flat, even if it is wound into a roll, it is not voluminous when compared with the bundle of optical fibers in the form of a tape, and the productivity is high.

The optical waveguide film of the present invention may optionally be linked to optical data by connecting the film or a part thereof with a laser, surface-emitting laser, photodiode, photodetector, optical fiber or the like. An electric wiring may be formed on the optical waveguide film, and the optical signal transmitted through the waveguide film may also be converted into electric signal on the optical waveguide film and electric connection to a apparatus can make on the film. A part of the optical waveguide film may be used as an optical waveguide, which part is obtained by cutting or punching of the optical waveguide film. Such a part can be produced at a lower cost than those produced by etching process or the like.

An exemplary embodiment of a production process of an optical waveguide film will now be described.

Two types of thermoplastic resins A and B are provided in the form pellets or the like. To further decrease the loss, it is preferred that the polymerization system and the film-forming system of the thermoplastic resins be a closed system. In this case, the resins are not necessarily in the form of pellets. After drying the pellets in hot air or under vacuum as required, they are fed to an extruder. In the extruder, the extrusion amount of the thermoplastic resins heated to melt is uniformized with a gear pump or the like, and foreign matters, modified thermoplastic resin and the like are removed by filtration.

As the extruder, either of a uniaxial extruder or a biaxial extruder may be used. As an exemplary method for adjusting the refractive index of the thermoplastic resin, there is a kneading technique by which the refractive index can be adjusted by alloying at nano-level two or more thermoplastic resins having different refractive indices. In this case, the structure of the screw may be very important. For example, when carrying out the alloying, as a uniaxial screw, Dulmadge type and Maddock type are preferred, and as a biaxial screw, a screw constitution with which strong kneading can be attained by employing a combination of paddles is preferred. On the other hand, in cases where one type of thermoplastic resin is extruded from one extruder, if the kneading is too strong, foreign matters which cause optical loss are generated, so that a uniaxial extruder using a full flight screw is preferred. The screw preferably has an L/D of not more than 28, more preferably not more than 24. The screw also preferably has a compression ratio of not more than 3, more preferably not more than 2.5. For removing foreign matters causing optical loss, a known technique such as vacuum vent extrusion or use of a filtration filter is effective. The pressure of the vacuum vent is preferably about 1-300 mmHg in terms of differential pressure. As for the filtration filter, a precision filtration can be attained by using an FSS (Fiber Sintered Stereo) leaf disk filter. Although it is preferred to appropriately select the filtration accuracy depending on the state of generation of the foreign matters such as amount or size thereof, and on the filtration pressure due to the viscosity of the resin, it is preferred to use a filter having a filtration accuracy of not more than 25 µm, more preferably not more than 10 µm, still more preferably not more than 5 µm. The resin pressure at the tip of the extruder at that time is preferably not more than 20 MPa, more preferably not more than 10 MPa from the viewpoint of decreasing the leakage of the resin.

Figure 8:
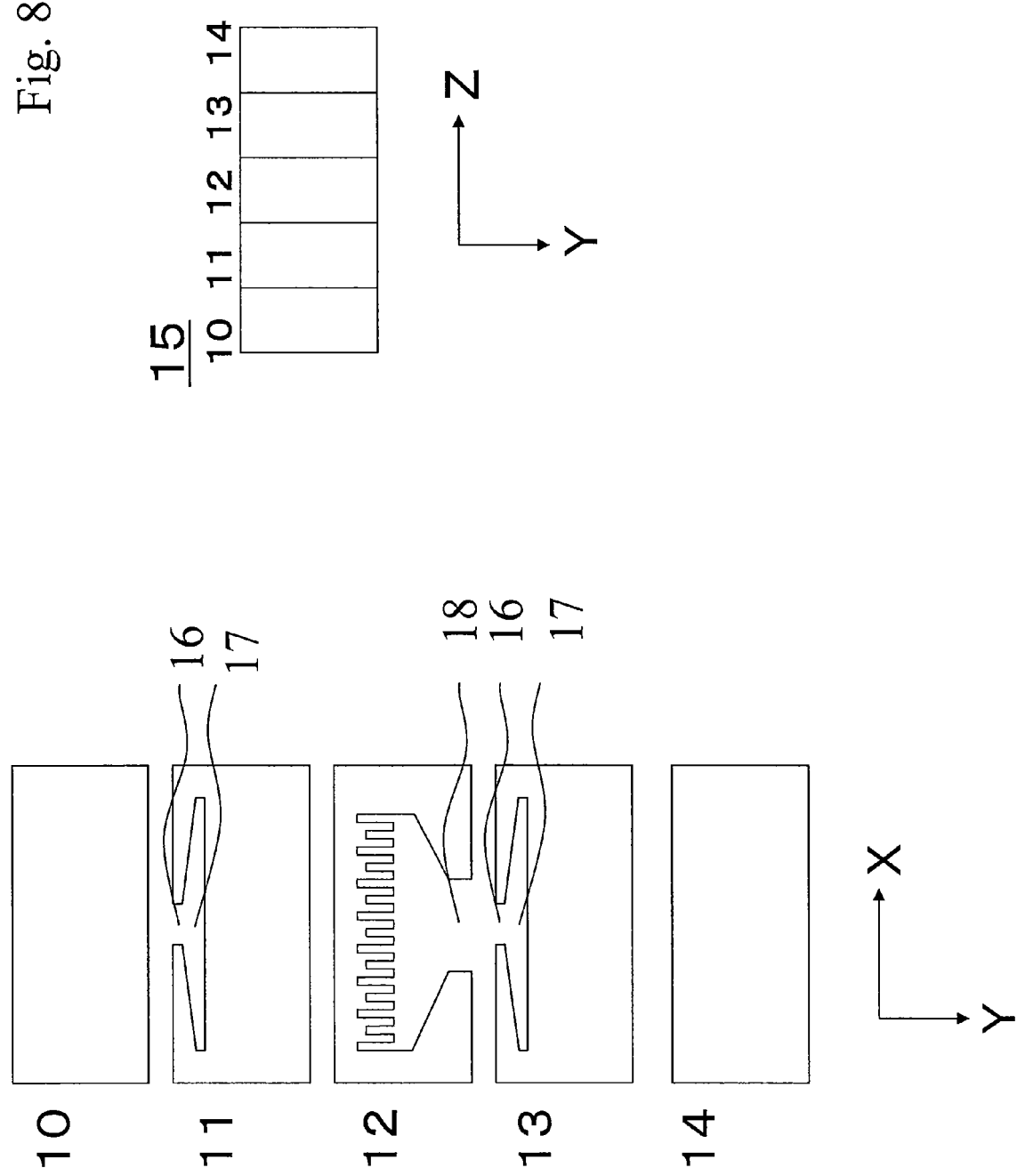
FIG. 8 is a plan view showing an example of a feedblock.

The thermoplastic resins discharged through different passes using two or more extruders are then fed to a comb type feedblock. A preferred embodiment of the comb type feedblock that can optionally be used in the present invention is shown in FIG. 8. FIG. 8 shows a plan view of the feedblock. The feedblock is constituted by a side plate 10, resin A-supplying section 11, slit section 12, resin B-supplying section 13 and a side plate 14, and is used after uniting these parts. The feedblock shown in FIG. 8 comprises a two resin inlets 16 originating from resin A-supplying section 11 and resin B-supplying section 13. Here, the type of the resin introduced into a plurality of slits existing in the slit section is determined by the positional relationship among the bottom faces of the respective liquid pools 17 in the resin A-supplying section 11 and the resin B-supplying section 13, and the ends of the respective slits. The mechanism is now explained.

Figure 9:
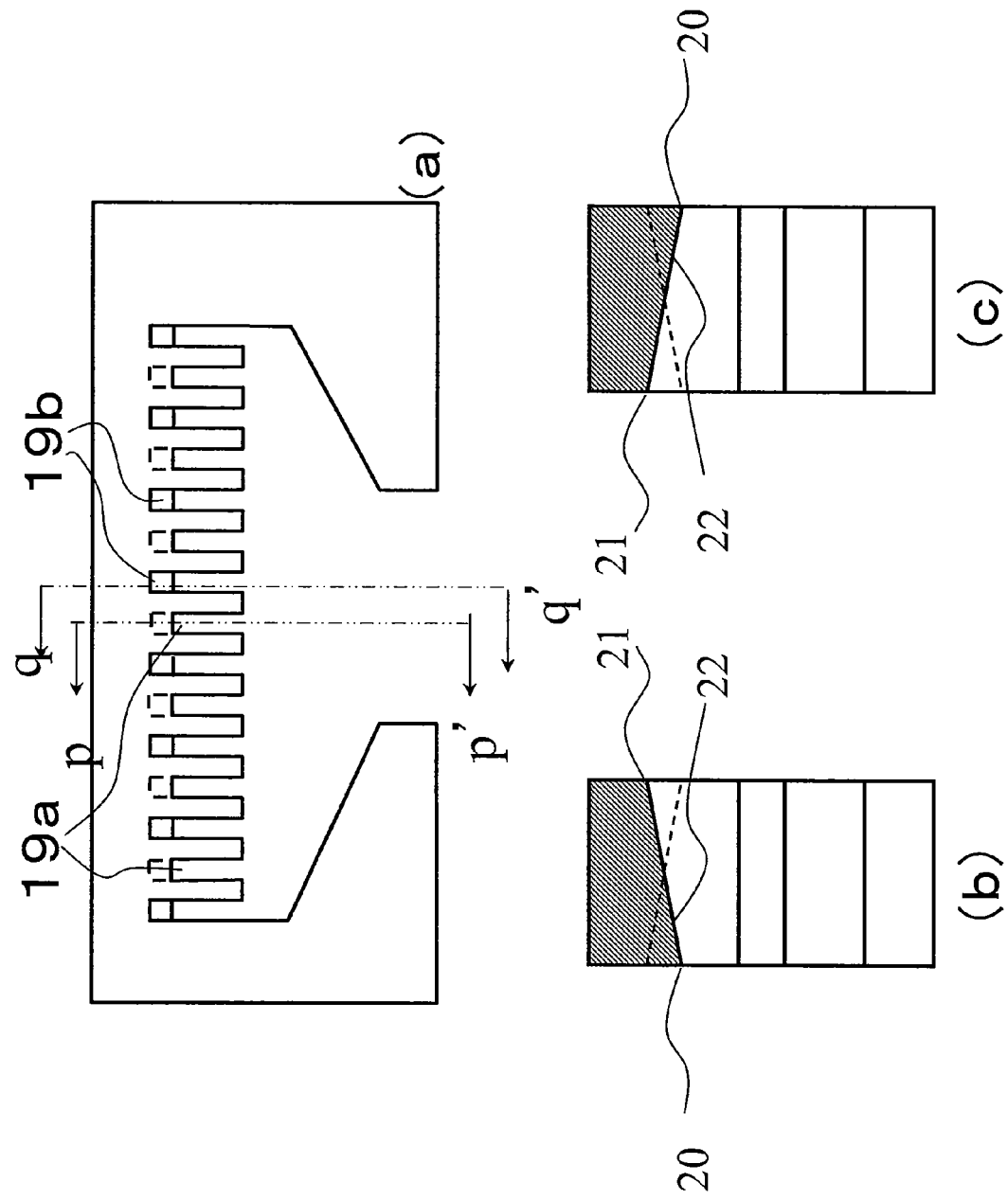
FIG. 9 is a plan view showing an example of a slit section.

FIG. 9(a) is an enlarged view of the slit section 12. The p-p' cross section showing the shape of a slit 19a is shown in FIG. 9(b), and the q-q' cross section showing the shape of a slit 19b is shown in FIG. 9(c). As shown in (b) and (c), an edge line 21 of each of the slits is slant with respect to the thickness direction of a slit-forming member.

Figure 10:
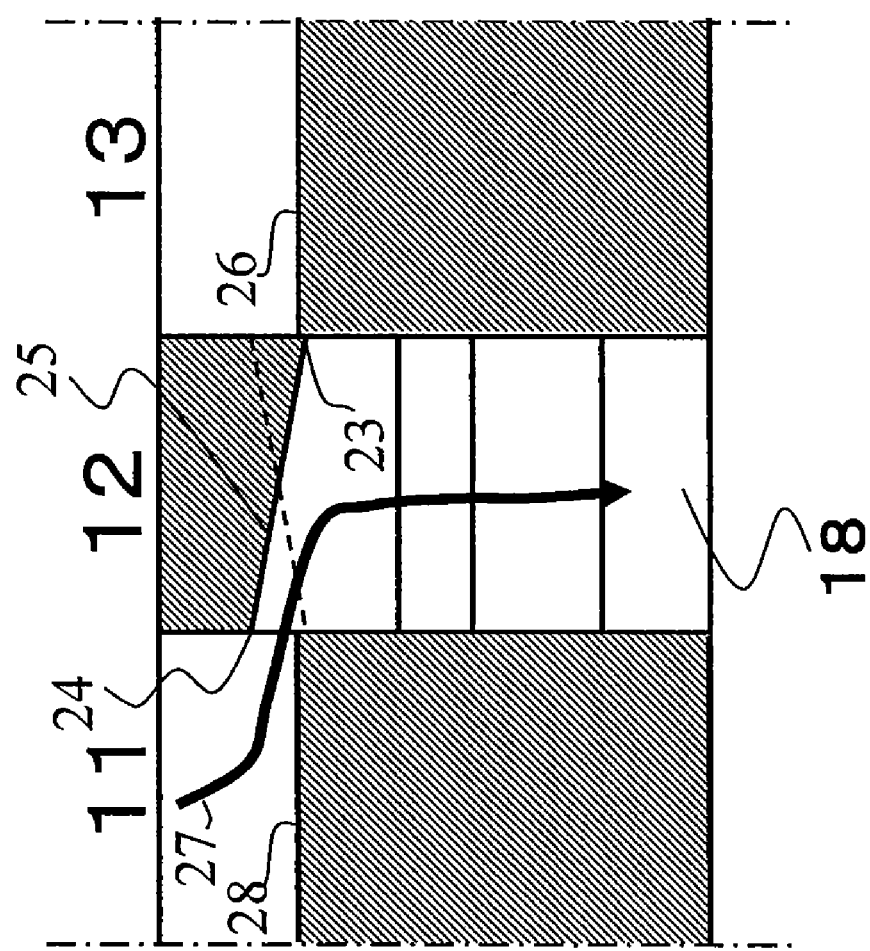
FIG. 10 is a view showing an example of passages in a feedblock.

FIG. 10 shows the resin A-supplying section 11, slit section 12, resin B-supplying section 13 in the feedblock. The level of the bottom faces 26 and 28 of the liquid pools in the respective resin A-supplying section 11 and resin B-supplying section 13 are located at a level between the upper end portion 24 and the lower end portion 23 of the edge line 25 existing in the slit section. With this construction, the resin is introduced from the side having a higher edge line 25 from the liquid pool 17 (arrow 27 in FIG. 10), but the slit is closed at the lower side of the edge line 25 and the resin is not introduced.

Although not shown, in the slit adjacent to the slit focused in FIG. 10, the inclination of the edge line of the slit is arranged opposite to that shown in FIG. 10, so that the resin from a resin A-supplying section 21 is introduced to the slit section 12. Thus, since the resin A or resin B is selectively introduced into each slit, when the resin B is used as a material for forming the claddings and the resin A is used as a material for forming the cores and/or core interval-adjusting portions, a flow of the resins having a structure in which a plurality of cores and cladding walls are arrayed is formed in the slit section 12 and is discharged from an outlet 18 at a lower portion of the member 15. That is, the origin of the structure in which the cores 3, core interval-adjusting portions 4 and cladding walls 2 are arrayed is formed.

By using such a feedblock, the number of cores can be easily adjusted by the number of the slits. Further, the core diameter can be easily adjusted by the shape of the slit (length, width), flow rate of the liquid, degree of compression in the transverse direction. On the other hand, although the shape of the cores is basically tetragonal, by adjusting the difference in the viscosity of the resin A and resin B, the tetragonal shape can be deformed during flowing to an ellipse or circle. The number of the slits is preferably not less than 5 and not more than 3000. If the number is less than 5, the number of the cores is too small, so that efficiency is low. On the other hand, if it is more than 3000, it is difficult to control the variation in flow rate and the accuracy of the core diameter is insufficient, optical coupling is difficult. The number of the slits is more preferably not less than 50 and not more than 1000. Within this range, a very efficient multi-channel optical waveguide can be provided while controlling the core diameter with high accuracy. In cases where the optical waveguide film has not less than 200 cores, it is preferred to use a feedblock having two or more separated slit sections. This is because that if not less than 400 slits (not less than 200 in terms of number of cores) exist in one slit section, it is difficult to uniformize the flow rate in each slit.

Figure 11:
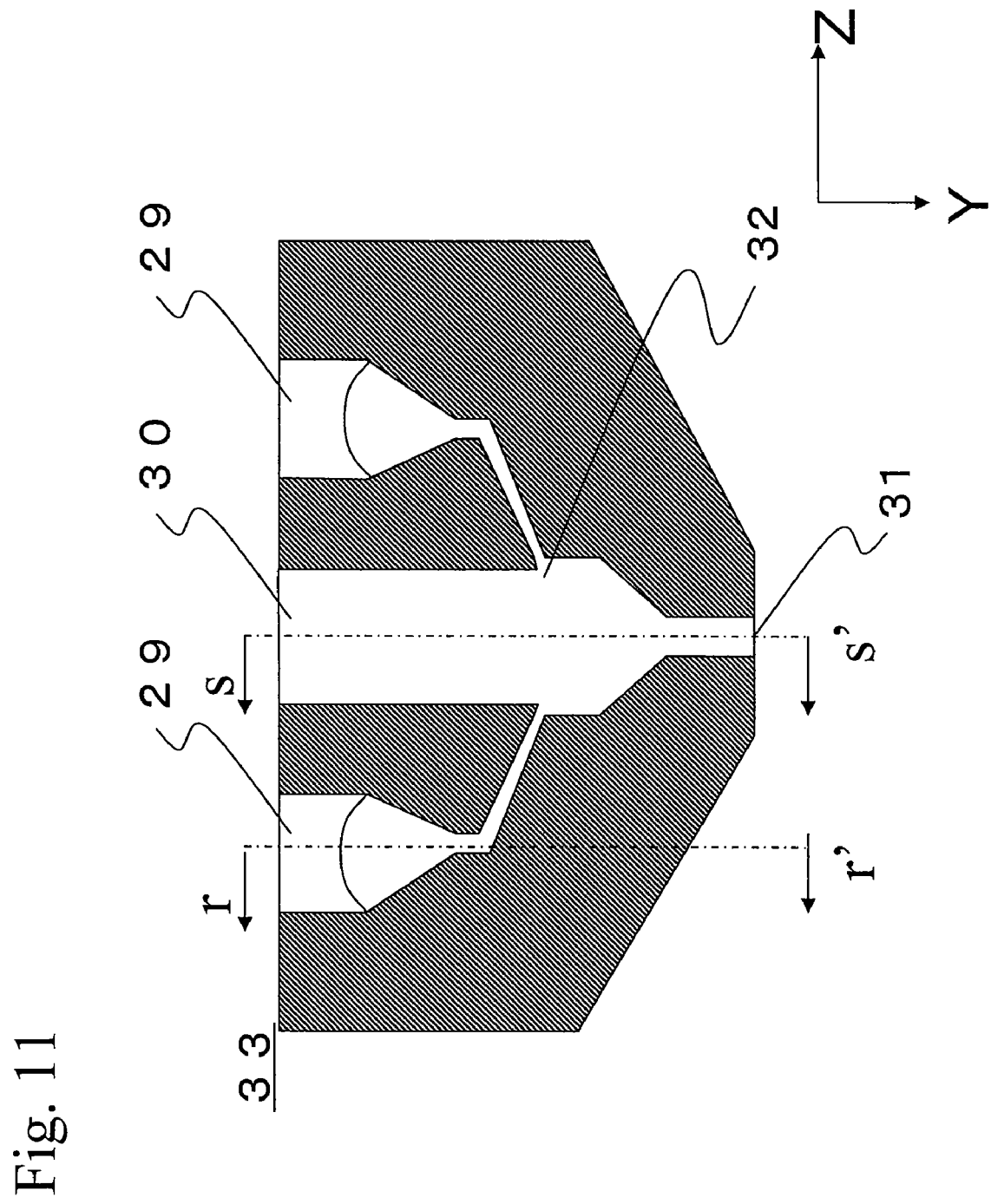
FIG. 11 is a cross-sectional view showing an example of a die.

On at least one side of the thus obtained fluid having the structure in which resin A and resin B are arrayed, the cladding layer(s) is(are) formed in a die shown in FIG. 11. FIG. 11 is a cross-sectional view of an embodiment of a die that can optionally be used in the present invention. The die shown in FIG. 11 has three inlets and resin B flows hereinto through an inlet 29. It is preferred that this resin B be supplied by means different from the feeding means of the above-described feedblock. The resin flow in which resin A and resin B are laminated, which flow was formed in the above-described feedblock, flows into an inlet 30. These are joined and laminate at a junction 32, thereby layers of resin B are formed on the surfaces of the resin flow in which resin A and resin B are laminated in the transverse direction, and the resulting flow is discharged from a die discharge outlet 31.

Figure 12:
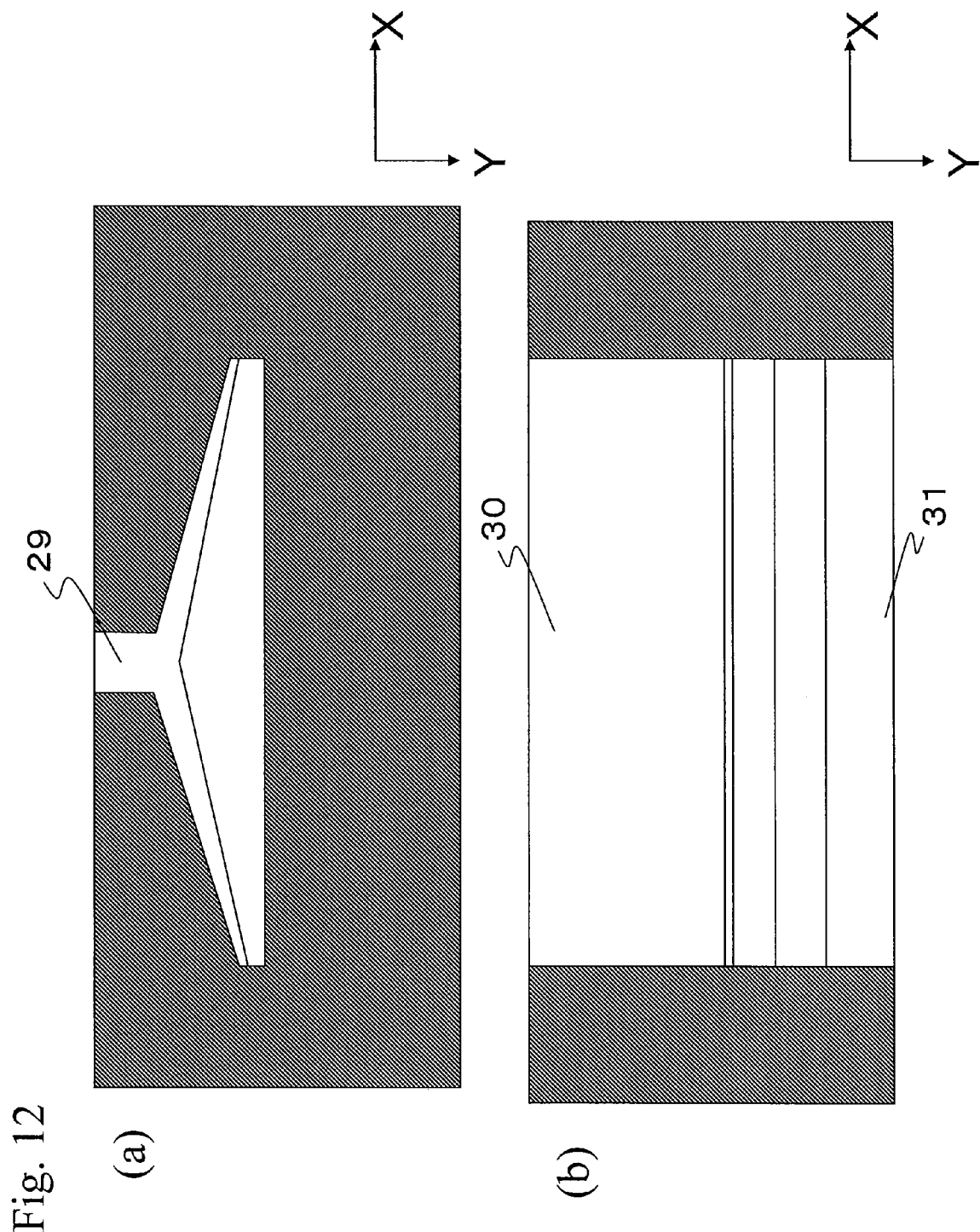
FIG. 12 is a cross-sectional view showing an example of the inside of a feedblock.

Here, the die used is one having two or more inlets and has at least a passage B having a width-enlarging ratio of not less than 2 and not more than 100, and a passage A having a width-enlarging ratio of not less than 0.5 and not more than 1.5, in the passage from the inlet to the junction. The term "width-enlarging ratio" is defined as the value obtained by dividing the width of the flow discharged from the die by a minimum value of each passage diameter (transverse direction). Each passage diameter means the diameter of the circle in cases where the shape of the passage is circular, and means the length of the width of the passage in cases where the shape of the passage is an ellipse or rectangle. This width-enlarging ratio is now explained referring to FIG. 12.

FIG. 12(a) is a cross-sectional view taken along r-r' in FIG. 11, and shows a part of the shape of the passage in the transverse direction-direction of flow, which passage corresponds to the passage B. FIG. 12(b) is a cross-sectional view taken along s-s' in FIG. 11, and shows the shape of the passage of the resin flow in which resin A and resin B are laminated in the transverse direction, formed in the feedblock, which passage corresponds to the passage A. In FIG. 12(a), the width of the flow from the inlet is enlarged so as to correspond to the width of discharge from the die, while in FIG. 12(b), width is substantially not enlarged or reduced. To attain a high alignment accuracy of the core diameter and a high dimensional accuracy of the core diameter, it is preferred not to enlarge the width of the resin flow or compress the resin flow as far as possible, and it is preferred that the width-enlarging ratio of the passage A be not less than 0.5 and not more than 1.5. More preferably the width-enlarging ratio is not less than 0.8 and not more than 1.2. In such a case, a higher accuracy is easily obtained. The passage B preferably has a width-enlarging ratio of not less than 2 and not more than 100. In such a case, it is easy to uniformize the thickness of the cladding layers at the surfaces. More preferably, the width-enlarging ratio is not less than 2 and not more than 35. In such a case, the dimensional accuracy of core diameter and alignment accuracy are higher.

Figure 15:
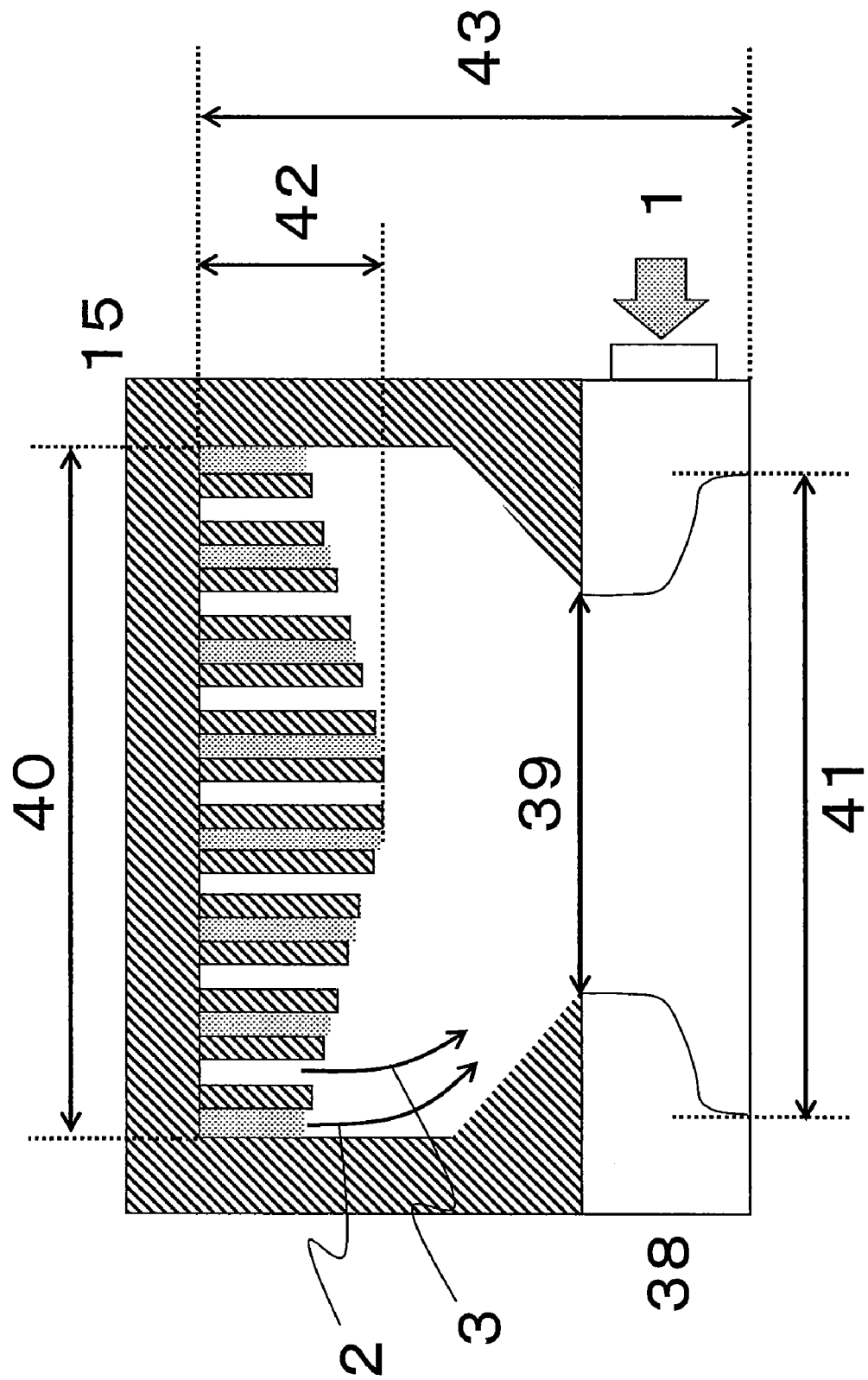
FIG. 15 is a front view for explaining an embodiment of a production process of a multi-core optical waveguide by employing a comb type feedblock directly connected to the die.

Similar to the die, the width-enlarging ratio of the feedblock is preferably not less than 0.1 and not more than 10. The width-enlarging ratio of the feedblock is calculated by dividing the length in the transverse direction at a site in the passage in the feedblock, at which the length in the transverse direction is the maximum, by the length in the transverse direction of the outlet of the feedblock. Referring to FIG. 15, the width-enlarging ratio is the value obtained by dividing the width 40 between the both wall surfaces of the slit plate by the width 39 of the outlet of the feedblock. If the width-enlarging ratio in the feedblock is less than 0.1 or more than 10, optimization of the core diameter only by the adjustment of the slit shape is difficult, which is not preferred. More preferably, the width-enlarging ratio is not less than 0.5 and not more than 7. In such a case, by adjusting the slit shape, the dimensional accuracy of the core diameter is higher. By using the above-described feedblock and the die, the sheet discharged from the die has a structure of the optical waveguide film as shown in FIG. 1 which is a preferred embodiment of the present invention.

Further, for providing an optical waveguide film having a high dimensional accuracy of the core diameter and a high alignment accuracy, it is preferred that the cladding layers 1 made of resin B be formed by using a compositing apparatus 33, and not using a die, on the resin flow in which the resin A and resin B are laminated in the transverse direction formed in the above-described feedblock 15. Since there is a possibility that the core shape may be deformed in the laminated resin flow until the resin flow reaches the die, it is preferred to coat the surfaces with resin B for forming the cladding layers 1 with the compositing apparatus 33 at a stage as early as possible. The resin B may be flown from a third extruder or may be the flow for the cladding layer delivered from one extruder after branching into a flow for the cladding layer 1 and a flow for the cladding wall 2.

The term "compositing apparatus" herein means a known as "pinol" used for composite lamination in the thickness direction of the film. As the pinol, a 2-type 3-layer ($\alpha/\beta/\alpha$ structure) compositing type is used. With this compositing apparatus, the polymer flow of the resin B/laminate in the transverse direction/resin B laminate is transferred to a usual single die 34 and extruded in the form of a sheet after enlarging the width thereof. More preferably, the width of the resin flow is not enlarged.

Figure 14:
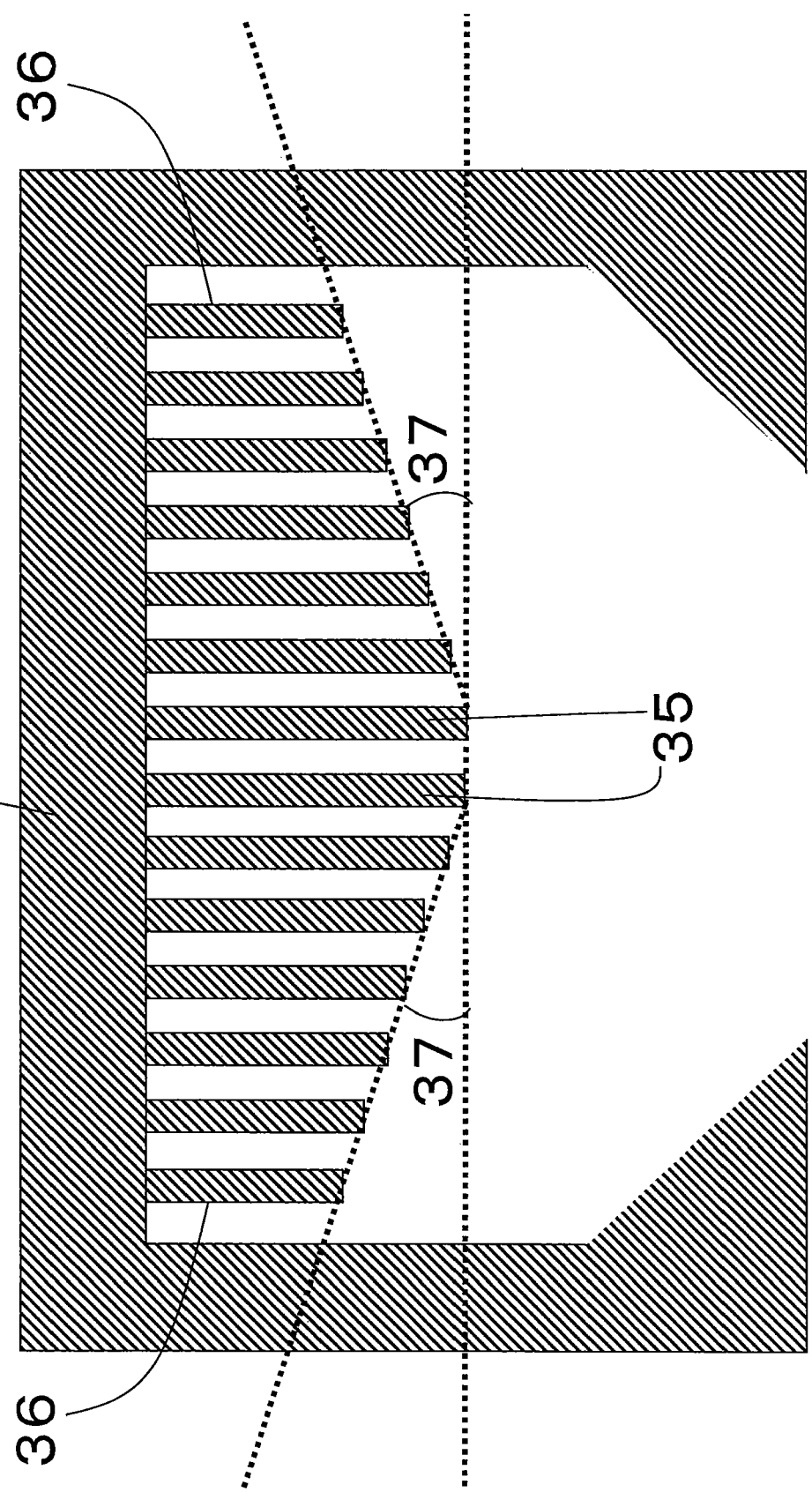
FIG. 14 is a front view showing a slit plate.

An embodiment of a preferred lamination method by which the variation in the cross-sectional areas of the cores in the optical waveguide film is decreased will now be described. A preferred method for decreasing the variation in the cross-sectional areas of the cores is to slightly adjust the slit length. In an embodiment as shown in FIG. 14, cores having a uniform cross-sectional area are obtained by gradually shortening the slit length from the central portion of a slit plate to the wall surface of the slit plate. The angle 37 formed by the line connecting the tip of a central slit-forming member 35 and the tip of a slit-forming member 36 located at the end is preferably not less than 3°, more preferably not less than 5°. In cases where the number of the slit-forming member is an even number, the angle is the angle formed by the two slit-forming members located at the center and the corresponding slit-forming member located at the slit-forming member closest to the wall surface. Although the maximum value of the angle varies depending on the viscosities of thermoplastic resin A and thermoplastic resin B, if the angle is not less than 5°, cores having a uniform cross-sectional area can be obtained with most resins. The inclination of the slit length may not be linear, but may have a structure in the form of, for example, a plurality of stepwise inclination or a curved inclination. The plurality of stepwise inclination structure is the structure wherein a point(s) at which the inclination angle is changed exist(s). The curved inclination structure is the structure wherein the inclination of the slit length forms a curve, that is, for example, the structure wherein the slit length changes like a quadric function. It can be understood from Formula (16) that the same effect can be obtained by gradually enlarging the slit width. It is preferred that the site(s) at which the slit length is adjusted be only the site(s) at which such an adjustment is beneficial or necessary.

To reduce the disturbance of the lamination due to the variation in temperatures of thermoplastic resin A and thermoplastic resin B in the feedblock 15, it is preferred to place a static mixer in each of the short pipes connected to the liquid pools 12. By placing the static mixer, the variation in the heating temperature of the thermoplastic resins does not occur, and a lamination in the transverse direction with high accuracy can be attained.

Further, when producing the optical waveguide film according to exemplary embodiments of the present invention, it is preferred to directly connecting the feedblock 15 and the multimanifold die 38 without inserting a short pipe, as shown in FIG. 15. By the direct connection, since the distance from the polymer junction to the polymer outlet is short, disturbance of the core shape can be prevented. To prevent the disturbance of the core shape, the value obtained by dividing the distance 43 from the polymer inlet to the die discharge outlet by the slit length 42 of the longest slit is preferably not more than 20. If this value is not less than 20, since the time for the resin to pass through the passage is long, disturbance of lamination is likely to occur, and the core shape is disturbed. More preferably, this value is not more than 10.

Thereafter, by cooling the sheet to solidify with a casting drum or the like, an optical waveguide film in which the cores extends in the machine direction and 3 or more cores are arrayed in the transverse direction of the film is obtained. From the viewpoint of attaining uniform lamination in the transverse direction, the cross-sectional shape of the polymer passage in the lamination apparatus is preferably tetragonal, especially one having an aspect ratio (length of the cross section of the passage in the transverse direction of the sheet/length in the thickness direction) of not less than 4, more preferably not less than 15. To keep the flatness of the film obtained, when cooling the sheet to solidify, an electrostatic voltage-applying method is preferably used wherein the sheet is intimately contacted to a cooling body such as a casting drum by electrostatic force using an electrode in the form of a wire, tape, needle, knife or the like. The electrostatic voltage-applying method is the method wherein the sheet in the melted state is intimately contacted to the casting drum electrostatically by applying a voltage of about 3 to 10 kV to a wire of tungsten or the like to generate electric field, thereby obtaining a sheet cooled to solidify. Moreover, a method wherein air is blown from an apparatus, in the form of slit, spot or plane, thereby intimately contacting the sheet to the cooling body such as a casting drum, or a calendaring casting using a known HCr-plated touch roll having a surface roughness of 0.4 S to 0.2 S, may be employed.

The thus obtained discharged sheet is cooled to solidify with a casting drum, calendaring roll or the like. Since the core intervals may be changed by the neck down phenomenon during discharge from the die, it is preferred to provide edge guides at the ends of the die lip. The edge guide is arranged between the die lip and the cooling body, and the neck down can be inhibited by the surface tension resulting from the slight contact between the edge guide and the resin. By so doing, although the resin film discharged from the die is made thin in the thickness direction due to the relation ship between the discharge rate and the casting speed, the dimension in the transverse direction does not change, so that the accuracy of the cores in the transverse direction is promoted. The obtained optical waveguide film is subjected to stretching or the like as required, and wound with a winder.

Figure 16:
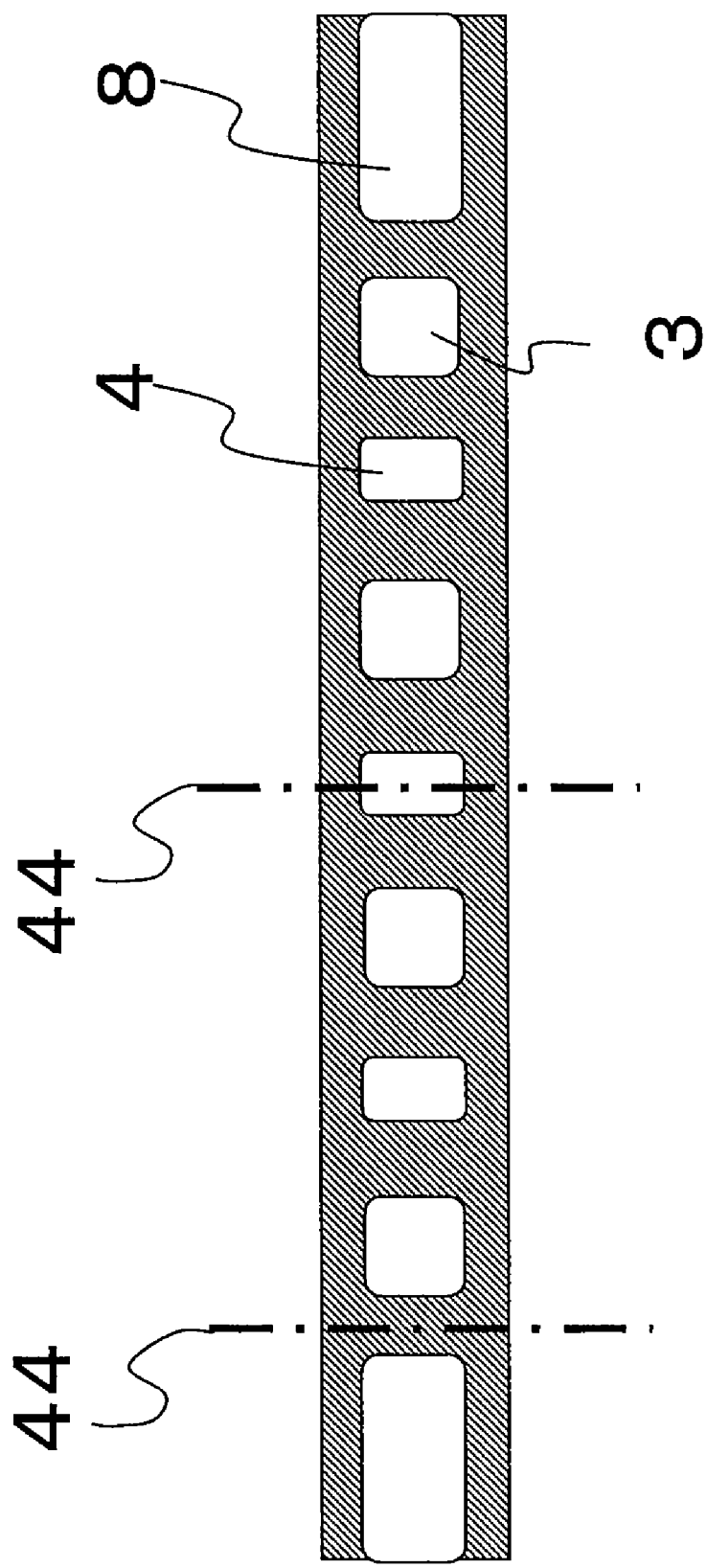
FIG. 16 shows the sites at which the optical waveguide film is cut off according to an exemplary embodiment.

The optical waveguide film is preferably used after being cut off along the machine direction of the film-thickness direction cross section. In FIG. 16, examples of the site 44 at which the optical waveguide film is cut off are shown. The cut off site may be on a core interval-adjusting portion or on a cladding wall, as long as it is not on a core. By cutting the film as such, for example, the unnecessary portions at the ends of the film may be removed, or a product resulting from the division of the optical waveguide film along the transverse direction of the film may be obtained. The cutting may be either the cutting with a blade made of a metal, ceramics or diamond, or the cutting using a laser or the like. As the laser, for example, YAG, He—Ne, carbon dioxide laser, femtosecond laser, excimer laser or the like may be employed.

The wavelength of the light used with the optical waveguide film is within the visible to near infrared region (400 nm-1550 nm). The wavelength of not more than 1200 nm is especially preferred. Although the wavelength used in the long distance communications is usually within the near infrared region, such as 1.55 µm or 1.31 µm, since thermoplastic resins are optionally used in the present invention, in general, the film often has an optical absorption edge in the above-described near infrared region. Therefore, a light is suited which has a wavelength from 600-1100 nm, especially, one having a wavelength of 850 nm or 650 nm, which has characteristic features that optical absorption is low and capacity of transmission is large.

Since the optical waveguide film according to an exemplary embodiment of the present invention is an optical waveguide in which light is guided, it is beneficial for the optical loss thereof to be low. By virtue of the fact that the optical loss is low, accurate optical information can be transmitted to a distant site. Therefore, the optical loss is preferably not more than 1 dB/cm, more preferably not more than 0.1 dB/cm, still more preferably not more than 0.05 dB/cm. This can be attained by using thermoplastic resins having a small light scattering and absorption loss, employing a highly symmetrical core shape and employing an appropriate core size.

The optical module using the optical waveguide film is a system harboring an optical I/O. The term "optical module" generally means electronic parts which convert light to electric current and vice versa. For example, it is a system having a basic constitution of vertical cavity surface-emitting laser (VCSEL) which is the side of transmitting light-optical waveguide film which is a polymer optical waveguide-photodiode which receives light. More specifically, for example, it is a system mounted on an optical-magnetic card, optical backplane for interconnecting apparatuses, between memory CPUs, or on the package of a switch LSI. The optical waveguide film of the present invention may be applied to uses such as display parts, solar cell parts, information communication parts, ornamental parts, illumination parts and the like. By irradiating the optical waveguide film with a light from the direction perpendicular to the film surface, since anisotropic diffusion or diffraction phenomenon occurs depending on the core intervals, the light is spread into prescribed directions. Therefore, the film may be used as an anisotropic diffusion plate or a viewing angle-controlling film, which are display parts, or as a polarizing film. By applying embossing or a coating having a high concentration of particles on the surface of the optical waveguide film, the above-described effects are more prominently obtained. Further, by combination with a lens or the like, a light can be efficiently guided into the waveguide, the film may be used as solar cell parts requiring photoelectric conversion. For example, light can be guided to solar cells through the optical waveguide film by interconnecting a core with a Fresnel lens and collecting solar light. By employing red, blue, yellow and green light as the source of the light to be guided, the film may be used for ornamental uses. Further, the film may be used as illumination parts by taking the light such as those from a halogen lamp, white LED, sun light or the like, waveguiding the light to the desired site through the optical waveguide film, and radiating the light. The optical waveguide film of the present invention can be used as the optical waveguide for short to middle/long distance communication such as inter-apparatus communication or intra-apparatus communication.

Therefore, the optical waveguide film of the present invention is preferably used in an illumination apparatus, communication apparatus or display apparatus. It may also be preferably used for a light guide with a connector. As the standard of the connector, in view of the versatility of the plastic multi-core type, MT connector, MPO connector, MPX connector, PMT connector or the like is preferred.

Moreover, the optical waveguide film of the present invention may be used as an image guide or parts for optical sensing. The light source therefor may be either LD or LED.

EXAMPLES

The methods for evaluation of the physical properties are now described.
(1) Inner Shape
The inner shape of a film was evaluated by observing under magnification cross-sections of a sample of the film in the thickness and transverse directions with an electronic microscope JSM-6700F (manufactured by JEOL), which sample was prepared by exposing the cross-sections (cross-sections in the thickness and transverse directions) with a microtome; taking photographs of the cross-sections; and measuring the number of cores, number of cladding walls, number of core interval-adjusting portions, core diameters and thicknesses of the cladding layers. The magnification was adjusted appropriately depending on the core diameters and cladding diameters so that measurements with high precision could be attained.
(2) Variation in Core Diameters
All of the diameters of the cores existing in the central portion in the transverse direction of the film, which central portion had a width of 3 cm were measured, and the variation R of the core diameters was calculated according to Formulae (12) and (13).
(3) Refractive Index
The refractive index of a resin was measured in accordance with Method A of JIS K7142 (1996). The refractive index was measured for each of the resins constituting the resin film. NA was calculated using this value.
(4) Difference in Propagation Loss
The difference in propagation loss was measured by the cut back method (IEC60793-C1A) in accordance with JIS C6823 (1999) at 25° C., 65% RH. As the light source, an LED with a wavelength of 850 nm was used. The propagation loss in the core located at the central portion and the propagation losses in the cores located at both ends were measured, and the difference between the maximum propagation loss and the minimum propagation loss was defined as the difference in loss (dB/m). The cases where the difference in the propagation loss was less than 0.5 dB/m is indicated as ⊚, the cases where the difference in the propagation loss was not less than 0.5 dB/m and less than 1 dB/m is indicated as ○, the cases where the difference in the propagation loss was not less than 1 dB/m and less than 3 dB/m is indicated as Δ, and the cases where the difference in the propagation loss was not less than 3 dB/m is indicated as x.
(5) Methods for Evaluation of Variation in Intervals Between Cores, Cross-Sectional Area of Cores and Core/Clad Area Ratio Cross-sections of a sample prepared by exposing the cross-sections (cross-sections in the thickness and transverse directions) with a cutter or microtome were observed with a light microscope. The observing magnifying power was about 20 to 700×, and the observed images were loaded into a personal computer. Then the file was opened using an image processing software, Image-Pro Plus ver.4 (sold by Planetron Co., Ltd.), and image processing was carried out as required. The image processing was carried out for clarifying the shape of the cores, and it was, for example, binary image processing, low-pass filter processing and the like by the software attached to the product.

Thereafter, in the image analysis, the image was arranged such that all cores were sandwiched between two parallel lines in the direction of the thickness of the film in the parallel thick profile mode, and the relationship between the position and the average brightness between the lines was read as numerical data. Using a spreadsheet application software (Excel 2000), the numerical treatment of three-point moving average was performed for the data of the position (μm) and the brightness, after sampling the data by sampling step 6 (thinning 6). Then the thus obtained data in which the brightness changes was differentiated, and the relative maximum and relative minimum of the differential curve were loaded with a visual basic application program, and the midpoint between the two extreme values located at the both ends (edges) of the core was calculated as the position of the midpoint of the core for all of the respective cores. Then the interval between adjacent midpoints was calculated as the core interval 5 shown in FIG. 4. This process was carried out for all of the photographs of the cross-sections in the thickness and transverse directions of the optical waveguide film, and the variation in the core intervals was calculated.

The variation (Vl) in the core intervals is defined by the following formula:

$$Vl=(Lmax-Lmin)/Lc \times 100(\%) \qquad \text{Formula (15)}$$

Vl: variation in core intervals
Lmax: maximum core interval
Lmin: minimum core interval
Lc: interval between the cores located at the center and the core adjacent thereto Here, in cases where the number of the cores is an odd number, Lc is the average of the intervals between the core located at the center and each of the two cores adjacent thereto. In cases where the number of the cores is an even number, Lc is the distance between the centers of the two cores located at the center. The variation in the core intervals was determined using as the sample the optical waveguide film whose both ends were trimmed by 10 mm.

The cross-sectional areas of the cores are determined by distinguishing the cores and the claddings by the image processing such as binary image processing as mentioned above for all of the photographs of the cross-sections in the transverse direction of the film and the areas are determined. That is, from the measurement items in the measurement menu in the Count/Size dialog box, "Area" was selected, and the Count Button was pressed, thereby carrying out the automatic measurement. By this, cross-sectional areas of all of the cores were determined, and the maximum number of the continuously arrayed cores satisfying Formula (5) was determined.

The length of the core-interval adjusting portions in the transverse direction of the film, with a length of not less than 10 mm was determined from the two extreme values in the differential curve, located at the both ends of the core-interval adjusting portion with a length of not less than 10 mm. In cases where such a core-interval adjusting portion existed at only the both ends, the average of the both ends was employed.

On the other hand, the core/clad area ratio was determined as follows: Each of the all photographs of the cross-sections in the transverse direction of the film is cut using the above-described image processing software such that the entire photograph is constituted by the cores, core-interval adjusting portions and the claddings. Then the cores and the claddings were distinguished by an image processing such as binary image processing as mentioned above, and the areas thereof were determined respectively. That is, from the measurement items in the measurement menu in the Count/Size dialog box, "Area" was selected, and the Count Button was pressed, thereby carrying out the automatic measurement. The area ratio of (cores+core-interval adjusting portions)/claddings was calculated from the total of the areas of the cores and the core-interval adjusting portions and the total of the areas of the claddings, which was defined as the core/clad area ratio.

(6) Method for Evaluation of Variation in Cross-sectional Areas of Cores in Machine Direction The cross-sectional areas of the cores of the film at an interval of 10 cm in the machine direction, which cores were located in the central portion in the transverse direction, were determined by the method described in item (5) of (Methods for Evaluation of Physical Properties). The average (Savg) of said cross-sectional areas of the cores at 10 points was calculated. The variation (Sv) in the cross-sectional areas of the cores in the machine direction was calculated according to the following Formula (17):

$$Sv=(Smax-Smin)/Savg \times 100(\%) \qquad \text{Formula (17)}$$

Sv: average of cross-sectional areas of cores at 10 points in machine direction of film at interval of 10 cm
Smax: maximum value of cross-sectional areas of cores at 10 points
Smin: minimum value of cross-sectional areas of cores at 10 points (7) Evaluation of Self-Supporting Property Using a tensile tester (automatic film strength and elongation measuring apparatus "Tensilon AMF/RTA-100" manufactured by Orientec) of instron type, the tensile elastic modulus was measured according to JIS-K7127 at 25° C. and 65% RH. Each sample was cut out from the central portion of the film in the transverse direction to a size of 10 mm width×50 mm gauge length, and the tensile elastic modulus was determined in only the machine direction (MD) by stretching the film at a tensile rate of 300 mm/min. The self-supporting property was evaluated according to the criteria below. The number of measurements n was 5 times, and the mean thereof was employed.

○: The tensile elastic modulus was not less than 1.5 GPa
Δ: The tensile elastic modulus was not less than 0.5 GPa and less than 1.5 GPa
x: The tensile elastic modulus was less than 0.5 GPa (8) Haze A piece cut out from the central portion in the transverse direction of the film, sizing 4.0 cm longitudinal length×3.5 cm width, was used as the sample. Using a haze meter (HGM-2DP (for light source C) manufactured by Suga Test Instruments), the haze of the optical waveguide film was measured.

(9) Melt Viscosity

Both of the thermoplastic resin A with which the cores are to be formed and the thermoplastic resin B with which the claddings are to be formed were dried at 80° C. for 4 hours or more in a vacuum oven and subjected to a pretreatment. The measurement conditions are as follows:

Apparatus: MR-300 Soliquid Meter (manufactured by Rheology Co., Ltd.)
Measurement System: cone-plate type
Cone Diameter: 18 mm
Cone Angle: 1.7 deg
Wire Diameter: 1 mm
Temperature: 250° C. (In only Examples 19, 29 to 32, the value at 280° C. was employed).
Distortion Angle: 0.5 deg
Angular Frequency: 0.6s-1 (0.1 Hz)-19s-1 (3 Hz)
Measurement Atmosphere: in nitrogen gas flow
The complex viscosity η* value at a frequency of 3 Hz was employed as the melt viscosity. The complex viscosity was determined from the viscosity measured by the rotational viscometer method according to the Cox-Merz rule.

(10) Loss

The loss was measured by the cut back method (IEC60793-C1A) in accordance with JIS C6823 (1999) at 25° C., 65% RH. As the light source, an LED (Q81212 manufactured by Advantest) with a wavelength of 850 nm was used, and light was input into the sample through a mode scrambler. As for the optical fibers, a multimode fiber type GI having a diameter of 50 μm was used for the input side, and an SI type fiber (NA0.5) having a core diameter of 0.98 mm was used for the detection side. In the input/output of the light, optical axes were aligned with a waveguide alignment system. As the detector, an optical power sensor (Q8221, Advantest) was used. The evaluation of the loss was carried out in accordance with the criteria below. The cores used for the measurement were the cores at the central portion in the transverse direction of the film. In cases where the core diameter was more than 980 μm, lighting was conducted using a lens and the light was detected.

◎: less than 0.05 dB/cm
○: not less than 0.05 dB/cm and less than 0.1 dB
Δ: not less than 0.1 dB and less than 1 dB/cm
×: not less than 1 dB/cm

(11) Melting Point Tm of Thermoplastic resin B and Melting Enthalpy of Crystals ΔHm Using differential scanning calorimetry (DSC), these were measured and calculated according to JIS-K-7122 (1987). A chip used for melt extrusion was heated from 25° C. to 280° C. at a rate of 10° C./min. The peak top during melting of the crystals was defined as the melting point, and the integrated value from the base line was defined as the melting enthalpy of crystals. The obtained results are shown in Table 3.

Apparatus: "Robot DSC-RDC220" manufactured by SEIKO Electronics
Data Analysis Disk Session SSC/5200
Sample Mass: 5 mg

(12) Heat shrinkage Ratio

A sample sizing 150 mm in machine direction×10 mm in transverse direction was provided. In this case, the sample was provided such that the longitudinal direction of the sample piece was coincided with the machine direction of the film to be measured. The sample piece was left to stand in an atmosphere at 23° C., 60% RH for 30 minutes. Under this atmosphere, two marks were placed in the machine direction of the film at an interval of about 100 mm, the interval between the marks was measured using a universal projector (Model V-16A) manufactured by Nikon, and the measured value was defined as A. Then the sample was left to stand in an atmosphere at 100° C. for 24 hours, and then cooled and humidified in an atmosphere at 23° C., 60% RH for 1 hour, followed by measuring the interval between the marks placed previously, which measured interval was defined as B. The heat shrinkage ratio was calculated according to the Formula (18) below. The number of measurements n was 3 times, and the mean thereof was employed.

$$\text{Heat shrinkage ratio}(\%) = 100 \times (A-B)/A \quad \text{Formula (18)}$$

Example 1

The following resin A and resin B were provided (Both of the thermoplastic resins A and B did not contain particles).
Resin A: polymethylmethacrylate (PMMA)
  Sumipex type MGSS, manufactured by Sumitomo Chemical.
Resin B: ethylene-tetrafluoroethylene copolymer (modified ETFE)
  Neoflon EFEP type RP-4020, manufactured by Daikin Industries.

Then resin A was fed to a vented extruder 1 and resin B was fed to a vented extruder 2. The resins were melted in the respective extruders at 240° C., and were flown into a feed block as shown in FIG. 8 after passing through a gear pump and a filter. At the feed block, resin A and resin B were alternately laminated in the transverse direction such that resin A constituted the both outermost layers, and the resulting laminate flow was guided to a die passage 2 (corresponding to an inlet 30 in FIG. 11) from the center inlet portion of the die as shown in FIG. 11. Resin B was also fed to an extruder 3 and melted at 240° C., which was then guided to a die passage 1 and a die passage 3 through inlet portions on the side of both surfaces of the die, after passing through a gear pump and a filter. The design values of the feed block and the die are shown in Table 1.

The sheet from the die was cast onto a calendaring roll while being engaged at the ends thereof with edge guides, thereby being quickly cooled to solidify. The thus obtained optical waveguide film was wound with a winder after being trimmed to a width of 50 mm. In the obtained film, resin A constituted the cores. The structure and performance of the obtained optical waveguide film are shown in Table 2-1.

Example 2-Example 10

Films were formed in the same manner as in Example 1 except that the shapes of the feed block and the die were changed as shown in Table 1-1. The structure and performance of the obtained optical waveguide films are shown in Table 2-1.

Comparative Example 1

A film was formed in the same manner as in Example 1 except that the shapes of the feed block and the die were changed as shown in Table 1. The structure and performance of the obtained optical waveguide film are shown in Table 2-1.

Comparative Example 2

A film was formed in the same manner as in Example 1 except that cladding layers were formed on the both surfaces in the inside of the feed block, that a die having one inlet was used, and that the shape of each apparatus was changed as shown in Table 1. The structure and performance of the obtained optical waveguide film are shown in Table 2-1.

Example 11

The following resin A and resin B were provided (Both of resins A and B did not contain particles).
Resin A: polymethylmethacrylate (PMMA)
  Acrypet type VH001, manufactured by Mitsubishi Rayon
Resin B: ethylene-tetrafluoroethylene copolymer (modified ETFE)
  Neoflon EFEP type RP-4020, manufactured by Daikin Industries.

Figure 13:
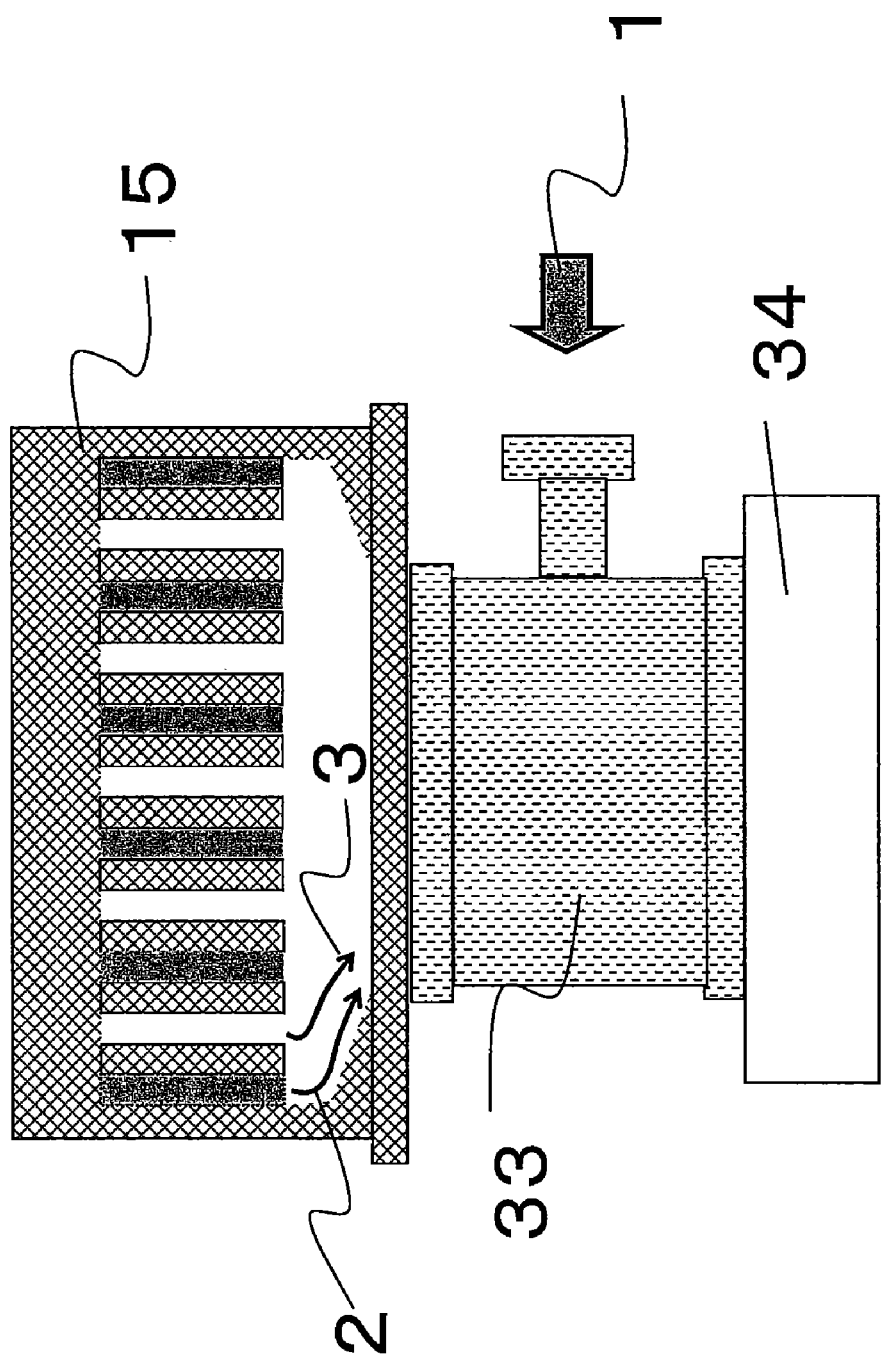
FIG. 13 is a front view for explaining an embodiment of a production process of a multi-core optical waveguide using a comb type feedblock.

Then resin A was fed to a uniaxial extruder 1 having an L/D of 26, resin B was fed to an extruder 2, and the resins were melted at 240° C. in the respective extruders. After passing through five FSS type leaf disk filters having a filtration accuracy of 10 μm, the resins were weighed in a gear pump such that a resin A/resin B extrusion ratio of 3.3/1 was attained, and the resins were flown into a feed block as shown in FIG. 8. At the feed block, resins A and B were alternately laminated in the transverse direction such that resin A constituted the outermost layers, and the resulting laminated flow was guided to a central inlet portion of a two-type 3-layer compositing apparatus 33 (pinol) as shown in FIG. 13. The two core interval-adjusting portions located at the both ends were constituted by resin A. Resin B was also fed to a uniaxial extruder 3, melted at 240° C. therein, and guided to a 2-type 3-layer compositing pinol (resin B/laminated flow/resin B=1/20/1) under the feed block as shown in FIG. 13 using a gear pump after passing through a filter, in an amount attaining an extrusion ratio to the above-described laminated flow of 10/1, such that the upper and lower sides thereof in the direction of thickness constituted cladding layers. The design values of the feed block and the die are shown in Table 1-2. The resultant was fed to a T-die to mold the flow into the form of a sheet, and the sheet was then quickly cooled to solidify on a casting drum whose surface temperature was kept at 25° C. while applying a static voltage of 8 kV with a wire to obtain an optical waveguide film which was an unstretched sheet. The cores were linearly arrayed in the transverse direction of the film and were continuous over a length of not less than several meters in the machine direction. The structure and performance of the obtained optical waveguide film are shown in Table 2-2.

Example 12

The following resin A and resin B were provided (Both of the resins A and B did not contain particles).
Resin A: polymethylmethacrylate (PMMA)
Acrypet type VH001, manufactured by Mitsubishi Rayon.
Resin B: ethylene-tetrafluoroethylene copolymer (modified ETFE)
Neoflon EFEP RP-4020, manufactured by Daikin Industries, Ltd.

Then resin A was fed to an uniaxial extruder 1, resin B was fed to an extruder 2, and the resins were melted at 240° C. in the respective extruders. After passing through five FSS type leaf disk filters having a filtration accuracy of 20 μm, the resins were weighed in a gear pump such that a resin A/resin B extrusion ratio of 6/1 was attained, and the resins were flown into a feed block as shown in FIG. 8. At the feed block, resins A and B were alternately laminated in the transverse direction such that resin A constituted the outermost layers, and the resulting laminated flow was guided to a central inlet portion of a two-type 3-layer compositing apparatus 33 (pinol) as shown in FIG. 13. The two core interval-adjusting portions located at the both ends were constituted by resin A. Resin B was also fed to an uniaxial extruder 3, melted at 240° C. therein, and guided to a 2-type 3-layer compositing pinol (resin B/laminated flow/resin B=1/14/1) under the feed block as shown in FIG. 13 using a gear pump after passing through a filter, in an amount attaining an extrusion ratio to the above-described laminated flow of 7/1, such that the upper and lower sides thereof in the direction of thickness constituted cladding layers. The design values of the feed block and the die are shown in Table 1-2. The resultant was fed to a T-die to mold the flow into the form of a sheet, and the sheet was then quickly cooled to solidify on a casting drum whose surface temperature was kept at 25° C. while applying a static voltage of 8 kV with a wire to obtain an optical waveguide film which was an unstretched sheet. The number of the core interval-adjusting portions in the film was 77, and the average of the length of the core interval-adjusting portions in the transverse direction of the film other than the both ends was about 1.5 mm. The cores were linearly arrayed in the transverse direction of the film and were continuous over a length of not less than several meters in the machine direction. The structure and performance of the obtained optical waveguide film are shown in Table 2-2.

Example 13

The same procedures as in Example 11 were repeated except that the resin A was changed to a styrene-copolymerized polymethylmethacrylate (Type TX400L, manufactured by Denki Kagaku Kogyo K. K.) to obtain an optical waveguide film. The cores were linearly arrayed in the transverse direction of the film and were continuous over a length of not less than several meters in the machine direction. The design values of the feed block and the die are shown in Table 1-2. The structure and performance of the obtained optical waveguide film are shown in Table 2-2.

Example 14

The same procedures as in Example 12 were repeated except that the resin A was changed to a styrene-copolymerized polymethylmethacrylate (Type TX400L, manufactured by Denki Kagaku Kogyo K. K.) to obtain an optical waveguide film. The design values of the feed block and the die are shown in Table 1-2. The structure and performance of the obtained optical waveguide film are shown in Table 2-2.

Example 15

The same procedures as in Example 11 were repeated except that the resin A was changed to polymethylmethacrylate (Type MGSS, manufactured by Sumitomo Chemical), the resin B was changed to a tetrafluoroethylene-ethylene copolymer having a composition of 20 mol % of tetrafluoroethylene and 80 mol % of vinylidene fluoride, and that the filtration accuracy was 5 μm to obtain an optical wave guide. The cores were linearly arrayed in the transverse direction of the film and were continuous over a length of not less than several meters in the machine direction. The design values of the feed block and the die are shown in Table 1-2. The structure and performance of the obtained optical waveguide film are shown in Table 2-2. By cutting off the edge portions of the film along the lines at 20 mm from the respective edges with a diamond cutter, an optical waveguide film having a very good flatness and is easy to attain optical coupling was obtained.

Example 16

An optical waveguide film was obtained by the same process as in Example 12' using the same resins as used in Example 15. The cores were linearly arrayed in the transverse direction of the film and were continuous over a length of not less than several meters in the machine direction. The design values of the feed block and the die are shown in Table 1-2. The structure and performance of the obtained optical waveguide film are shown in Table 2-2. The cores were linearly arrayed in the transverse direction of the film and were continuous over a length of not less than several meters in the machine direction. The structure and performance of the obtained optical waveguide film are shown in Table 2-2.

Example 17

The following resin A and resin B were provided (Both of the resins A and B did not contain particles).

Resin A: polymethylmethacrylate (PMMA)
  Sumipex type LG2, manufactured by Sumitomo Chemical.
Resin B: polyvinylidene fluoride (PVDF)
  KF polymer type T#850, manufactured by Kureha Chemical Industry Then resin A was fed to an uniaxial extruder 1, resin B was fed to an extruder 2, and the resins were melted at 240° C. in the respective extruders. After passing through two FSS type leaf disk filters having a filtration accuracy of 20 μm, the resins were weighed in a gear pump such that a resin A/resin B extrusion ratio of 2.8/1 was attained, and the resins were flown into a feed block as shown in FIG. 8. At the feed block, resins A and B were alternately laminated in the transverse direction such that resin A constituted the outermost layers, and the resulting laminated flow was guided to a central inlet portion of a two-type 3-layer compositing apparatus 33 (pinol) as shown in FIG. 13. The two core interval-adjusting portions located at the both ends were constituted by resin A. Resin B was also fed to an uniaxial extruder 3, melted at 240° C. therein, and guided to a 2-type 3-layer compositing pinol (resin B/laminated flow/resin B=1/7.2/1) under the feed block as shown in FIG. 13 using a gear pump after passing through a filter, in an amount attaining an extrusion ratio to the above-described laminated flow of 3.6/1, such that the upper and lower sides thereof in the direction of thickness constituted cladding layers. The design values of the feed block and the die are shown in Table 1-2. The design values of the feed block and the die are shown in Table 1-2. The resultant was fed to a T-die to mold the flow into the form of a sheet, and the sheet was then quickly cooled to solidify on a casting drum whose surface temperature was kept at 25° C. while applying a static voltage of 8 kV with a wire to obtain an optical waveguide film which was an unstretched sheet. The cores were linearly arrayed in the transverse direction of the film and were continuous over a length of not less than several meters in the machine direction. The structure and performance of the obtained optical waveguide film are shown in Table 2-2. However, a slight disturbance in the surface layer like flow marks was also observed.

Example 18

The following resin A and resin B were provided (Both of the resins A and B did not contain particles).
Resin A: polymethylmethacrylate (PMMA)
  Acrypet type MD, manufactured by Mitsubishi Rayon.
Resin B: tetrafluoroethylene-ethylene copolymer
  Type LM-730-AP, manufactured by Asahi Glass Then resin A was fed to a uniaxial extruder 1, resin B was fed to an extruder 2, and the resins were melted at 240° C. in the respective extruders. After passing through two FSS type leaf disk filters having a filtration accuracy of 100 μm, the resins were weighed in a gear pump such that a resin A composition/resin B composition extrusion ratio of 0.76/1 was attained, and the resins were flown into a feed block as shown in FIG. 8. At the feed block, resins A and B were alternately laminated in the transverse direction such that resin A constituted the outermost layers, and the resulting laminated flow was guided to a central inlet portion of a two-type 3-layer compositing apparatus 33 (pinol) as shown in FIG. 13. The two core interval-adjusting portions located at the both ends were constituted by resin A. Resin B was also fed to an uniaxial extruder 3, melted at 240° C. therein, and guided to a 2-type 3-layer compositing pinol (resin B/laminated flow/resin B=1/8.5/1) under the feed block as shown in FIG. 13 using a gear pump after passing through a filter, in an amount attaining an extrusion ratio to the above-described laminated flow of 4.25/1, such that the upper and lower sides thereof in the direction of thickness constituted cladding layers. The design values of the feed block and the die are shown in Table 1-2. The resultant was fed to a T-die to mold the flow into the form of a sheet, and the sheet was then quickly cooled to solidify on a casting drum whose surface temperature was kept at 25° C. while applying a static voltage of 8 kV with a wire to obtain an optical waveguide film which was an unstretched sheet. The cores were linearly arrayed in the transverse direction of the film and were continuous over a length of not less than several meters in the machine direction. The structure and performance of the obtained optical waveguide film are shown in Table 2-2. The lengths of the core interval-adjusting portions in the transverse direction of the sampled optical waveguide film except for the both end portions were about 300 μm. However, a slight disturbance in the surface layer like flow marks was also observed.

Example 19

The same procedures as in Example 18 were repeated except that resin A was changed to polyethylene naphthalate and that resin B was changed to polyethylene terephthalate to obtain an optical waveguide film. The cores were linearly arrayed in the transverse direction of the film and were continuous over a length of not less than several meters in the machine direction. The design values of the feed block and the die are shown in Table 1-2. The structure and performance of the obtained optical waveguide film are shown in Table 2-2. The cores were linearly arrayed in the transverse direction of the film and were continuous over a length of not less than several meters in the machine direction. The structure and performance of the obtained optical waveguide film are shown in Table 2-2.

Example 20

The following resin A and resin B were provided (Both of the resins A and B did not contain particles).
Resin A: polymethylmethacrylate (PMMA)
  Sumipex type MH, manufactured by Sumitomo Chemical.
Resin B: polyvinylidene fluoride (PVDF)
  KF polymer type T#850, manufactured by Kureha Chemical Industry Then resin A was fed to a uniaxial extruder 1, resin B was fed to an extruder 2, and the resins were melted at 265° C. in the respective extruders. After passing through two FSS type leaf disk filters having a filtration accuracy of 20 μm, the resins were weighed in a gear pump such that a resin A/resin B extrusion ratio of 0.32/1 was attained, and the resins were flown into a feed block as shown in FIG. 8. At the feed block, resins A and B were alternately laminated in the transverse direction such that resin A constituted the outermost layers, and the resulting laminated flow was guided to a central inlet portion of a two-type 3-layer compositing apparatus 33 (pinol) as shown in FIG. 13. The two core interval-adjusting portions located at the both ends were constituted by resin A. Resin B was also fed to an uniaxial extruder 3, melted at 240° C. therein, and guided to a 2-type 3-layer compositing pinol (resin B/laminated flow/resin B=1/20/1)) under the feed block as shown in FIG. 13 using a gear pump after passing through a filter, in an amount attaining an extrusion ratio to the above-described laminated flow of 10/1, such that the upper and lower sides thereof in the direction of thickness constituted cladding layers. The design values of the feed block and the die are shown in Table 1-2. The resultant was fed to a T-die to mold the flow into the form of a sheet, and the sheet was then quickly cooled to solidify on a casting drum whose surface temperature was kept at 25° C. while applying a static voltage of 8 kV with a wire to obtain an optical waveguide film which was an unstretched sheet. The cores in the both end portions in the transverse direction of the sampled optical waveguide film were largely deformed, and the stiffness of the film was so small that it was difficult to attain optical coupling. However, the central region having a width of 5 cm had no problem on the variations of the optical performance. The structure and performance of the obtained optical waveguide film are shown in Table 2-2.

Example 21

The following resin A and resin B were provided (Both of the resins A and B did not contain particles).
Resin A: alloy between polymethylmethacrylate (PMMA) and polyvinylidene fluoride (PVDF) (weight ratio 4:1)
    PMMA: Sumipex type MH, manufactured by Sumitomo Chemical.
    PVDF: KF polymer type T#850, manufactured by Kureha Chemical Industry
Resin B: polyvinylidene fluoride (PVDF)
    KF polymer type T#850, manufactured by Kureha Chemical Industry Then resin A was fed to a uniaxial extruder 1, resin B was fed to an extruder 2, and the resins were melted at 265° C. in the respective extruders. After passing through two FSS type leaf disk filters having a filtration accuracy of 20 μm, the resins were weighed in a gear pump such that a resin A/resin B extrusion ratio of 0.125/1 was attained, and the resins were flown into a feed block as shown in FIG. 8. At the feed block, resins A and B were alternately laminated in the transverse direction such that resin A constituted the outermost layers, and the resulting laminated flow was guided to a central inlet portion of a two-type 3-layer compositing apparatus 33 (pinol) as shown in FIG. 13. The two core interval-adjusting portions located at the both ends were constituted by resin A. Resin B was also fed to an uniaxial extruder 3, melted at 240° C. therein, and guided to a 2-type 3-layer compositing pinol (resin B/laminated flow/resin B=1/10/1)) under the feed block as shown in FIG. 13 using a gear pump after passing through a filter, in an amount attaining an extrusion ratio to the above-described laminated flow of 5/1, such that the upper and lower sides thereof in the direction of thickness constituted cladding layers. The design values of the feed block and the die are shown in Table 1-2. The resultant was fed to a T-die to mold the flow into the form of a sheet, and the sheet was then quickly cooled to solidify on a casting drum whose surface temperature was kept at 25° C. while applying a static voltage of 8 kV with a wire to obtain an optical waveguide film which was an unstretched sheet. The cores in the both end portions in the transverse direction of the sampled optical waveguide film were largely deformed, flow marks were observed in the film surface, and the stiffness of the film was so small that it was difficult to attain optical coupling. However, the central region having a width of 5 cm had no problem on the variations of the optical performance. The structure and performance of the obtained optical waveguide film are shown in Table 2-2.

Example 22

The following resin A and resin B were provided (Both of the resins A and B did not contain particles).
Resin A: polymethylmethacrylate (PMMA)
    Sumipex type MH, manufactured by Sumitomo Chemical.
Resin B: polyvinylidene fluoride (PVDF)
    KF polymer type T10, manufactured by Kureha Chemical Industry Then resin A was fed to a uniaxial extruder 1, resin B was fed to an extruder 2, and the resins were melted at 265° C. in the respective extruders. After passing through five FSS type leaf disk filters having a filtration accuracy of 5 μm, the resins were weighed in a gear pump such that a resin A/resin B extrusion ratio of 3.3/1 was attained, and the resins were flown into a feed block as shown in FIG. 8. At the feed block, resin A and resin B were alternately laminated in the transverse direction such that resin A constituted the both outermost layers, and the resulting laminated flow was guided to a die passage 2 from the center inlet portion of the die as shown in FIG. 11. Resin B was also fed to an extruder 3 and melted at 240° C., which was then guided to a die passage 1 and a die passage 3 through inlet portions on the side of both surfaces of the die, after passing through a gear pump and a filter. At this time, the amounts of extrusion were set so as to attain a ratio of die flow rate 2/(die flow rate 1+die flow rate 3) of 10/1. The design values of the feed block and the die as shown in FIG. 15 are shown in Table 1-3. The resultant was fed to a T-die to mold the flow into the form of a sheet at a draft ratio of 2, and the sheet was then quickly cooled to solidify on a casting drum whose surface temperature was kept at 25° C. while applying a static voltage of 9 kV with a wire to obtain an optical waveguide film which was an unstretched sheet. The cores of the sampled optical waveguide film were linearly arrayed in the transverse direction of the film and were continuous over a length of not less than several meters in the machine direction. The film was an optical waveguide film which excelled in the variation in the optical performance. The structure and performance of the obtained optical waveguide film are shown in Table 2-3.

Example 23

An optical waveguide film was obtained in the same manner as in Example 22 except that resin A was changed to a styrene-copolymerized polymethylmethacrylate (Type TX800LF, manufactured by Denki Kagaku Kogyo K. K.), and that the feed block had an angle of inclination of 4°. The design values of the feed block and the die are shown in Table 1-3. The cores of the sampled optical waveguide film were linearly arrayed in the transverse direction of the film and were continuous over a length of not less than several meters in the machine direction. The film was an optical waveguide film which excelled in the variation in the optical performance. The structure and performance of the obtained optical waveguide film are shown in Table 2-3.

Example 24

An optical waveguide film was obtained in the same manner as in Example 22 except that resin A was changed to a polymethylmethacrylate (Type MD, manufactured by Mitsubishi Rayon), both of the extrusion temperatures were changed to 240° C. and that the design values of the feed block and the die were changed. The design values of the feedblock and the die are shown in Table 1-3. The cores of the sampled optical waveguide film were linearly arrayed in the transverse direction of the film and were continuous over a length of not less than several meters in the machine direction. The film was an optical waveguide film which excelled in the variation in the optical performance. The structure and performance of the obtained optical waveguide film are shown in Table 2-3.

Example 25

The following resin A and resin B were provided (Both of the resins A and B did not contain particles).
Resin A: polymethylmethacrylate (PMMA)
  Sumipex type MH, manufactured by Sumitomo Chemical.
Resin B: tetrafluoroethylene-ethylene copolymer
  Type LM-730-AP, manufactured by Asahi Glass Then resin A was fed to an uniaxial extruder 1, resin B was fed to an extruder 2, and the resins were melted at 265° C. in the respective extruders. After passing through five FSS type leaf disk filters having a filtration accuracy of 20 μm, the resins were weighed in a gear pump such that a resin A/resin B extrusion ratio of 3.3/1 was attained, and the resins were flown into a feed block as shown in FIG. 8. At the feed block, resin A and resin B were alternately laminated in the transverse direction such that resin A constituted the both outermost layers, and the resulting laminated flow was guided to a die passage 2 from the center inlet portion of the die as shown in FIG. 11. Resin B was also fed to an extruder 3 and melted at 240° C., which was then guided to a die passage 1 and a die passage 3 through inlet portions on the side of both surfaces of the die, after passing through a gear pump and a filter. At this time, the amounts of extrusion were set so as to attain a ratio of die flow rate 2/(die flow rate 1+die flow rate 3) of 7/1. The design values of the feed block and the die are shown in Table 1-3. The resultant was fed to a T-die to mold the flow into the form of a sheet at a draft ratio of 10, and the sheet was then quickly cooled to solidify on a casting drum whose surface temperature was kept at 25° C. while applying a static voltage of 9 kV with a wire to obtain an optical waveguide film which was an unstretched sheet. The cores of the sampled optical waveguide film were linearly arrayed in the transverse direction of the film and were continuous over a length of not less than several meters in the machine direction. The film was an optical waveguide film which excelled in the variation in the optical performance. The structure and performance of the obtained optical waveguide film are shown in Table 2-3.

Example 26

An optical waveguide film was obtained in the same manner as in Example 25 except that resin B was changed to a tetrafluoroethylene-ethylene copolymer (Neoflon EFEP RP-4020, manufactured by Daikin Industries, Ltd.) and that the design values of the feed block and the die were changed. The cores of the sampled optical waveguide film were linearly arrayed in the transverse direction of the film and were continuous over a length of not less than several meters in the machine direction. The film was an optical waveguide film which excelled in the variation in the optical performance. The structure and performance of the obtained optical waveguide film are shown in Table 2-3.

Comparative Example 3

The following resin A and resin B were provided (Both of the resins A and B did not contain particles).
Resin A: polymethylmethacrylate (PMMA)
  Sumipex type LG2, manufactured by Sumitomo Chemical.
Resin B: tetrafluoroethylene-ethylene copolymer
  Type LM-730-AP, manufactured by Asahi Glass Then resin A was fed to an uniaxial extruder 1, resin B was fed to an extruder 2, and the resins were melted at 265° C. in the respective extruders. After passing through five FSS type leaf disk filters having a filtration accuracy of 20 μm, the resins were weighed in a gear pump such that a resin A/resin B extrusion ratio of 0.5/1 was attained, and the resins were flown into a feed block as shown in FIG. 8. At the feed block, resin A and resin B were alternately laminated in the transverse direction such that resin A constituted the both outermost layers, and the resulting laminated flow was guided to a die passage 2 from the center inlet portion of the die as shown in FIG. 11. Resin B was also fed to an extruder 3 and melted at 240° C., which was then guided to a die passage 1 and a die passage 3 through inlet portions on the side of both surfaces of the die, after passing through a gear pump and a filter. At this time, the amounts of extrusion were set so as to attain a ratio of die flow rate 2/(die flow rate 1+die flow rate 3) of 10/1. The design values of the feed block and the die are shown in Table 1-3. The resultant was fed to a T-die to mold the flow into the form of a sheet, and the sheet was then quickly cooled to solidify on a casting drum whose surface temperature was kept at 25° C. while applying a static voltage of 9 kV with a wire to obtain an optical waveguide film which was an unstretched sheet. The cores in the both end portions in the transverse direction of the sampled optical waveguide film were largely deformed, it was difficult to attain optical coupling. Further, the variations in the core intervals were large, so that it was difficult to attain alignment for the optical coupling. The number of cores irregularly arrayed in the transverse direction of the film was 51, and these cores were continuous over a length of not less than several meters in the machine direction. The film was an optical waveguide film having a large variations in the optical performance. The structure and performance of the obtained optical waveguide film are shown in Table 2-3.

Example 27

The following resin A and resin B were provided (Both of the resins A and B did not contain particles).
Resin A: polymethylmethacrylate (PMMA)
  Sumipex type MH, manufactured by Sumitomo Chemical.
Resin B: polyvinylidene fluoride (PVDF)
  KF polymer type T10, manufactured by Kureha Chemical Industry Then resin A was fed to an uniaxial extruder 1, resin B was fed to an extruder 2, and the resins were melted at 265° C. in the respective extruders. After passing through five FSS type leaf disk filters having a filtration accuracy of 10 μm, the resins were weighed in a gear pump such that a resin A/resin B extrusion ratio of 0.3/1 was attained, and the resins were flown into a feed block as shown in FIG. 8. At the feed block, resin A and resin B were alternately laminated in the transverse direction such that resin A constituted the both outermost layers, and the resulting laminated flow was guided to a die passage 2 from the center inlet portion of the die as shown in FIG. 11. Resin B was also fed to an extruder 3 and melted at 240° C., which was then guided to a die passage 1 and a die passage 3 through inlet portions on the side of both surfaces of the die, after passing through a gear pump and a filter. At this time, the amounts of extrusion were set so as to attain a ratio of die flow rate 2/(die flow rate 1+die flow rate 3) of 10/1. The design values of the feed block and the die are shown in Table 1-3. The resultant was fed to a T-die to mold the flow into the form of a sheet, and the sheet was then quickly cooled to solidify on a casting drum whose surface temperature was kept at 25° C. while applying a static voltage of 9 kV with a wire to obtain an optical waveguide film which was an unstretched sheet. The cores of the sampled optical waveguide film were linearly arrayed in the transverse direction of the film and were continuous over a length of not less than several meters in the machine direction. The film was an optical waveguide film whose central region having a width of 5 cm excelled in the variation in the optical performance. The structure and performance of the obtained optical waveguide film are shown in Table 2-3. The haze value was more than 10%.

Example 28

An optical waveguide film was obtained in the same manner as in Example 27 except that the ratio of resin A/resin B was changed to 0.125/1, the ratio of die flow rate 2/(die flow rate 1+die flow rate 3) was changed to 5/1, and that the design values of the feed block and the die were changed. The cores of the sampled optical waveguide film were linearly arrayed in the transverse direction of the film and were continuous over a length of not less than several meters in the machine direction. The film was an optical waveguide film whose central portion excelled in the variation in the optical performance. The structure and performance of the obtained optical waveguide film are shown in Table 2-3.

Examples 29-33

Film formation was carried out under the same conditions including the shapes of the feed block and the die as in Example 1 except that the thermoplastic resin A with which the cores were to be formed and the thermoplastic resin B with which the claddings were to be formed were changed. The structure and performance of the obtained optical waveguide films are shown in Table 2-4. The shapes of the feed block and the die are shown in Table 1-4.
The resins used are shown below.

Example 29

The following resin A and resin B were provided (Both of the thermoplastic resins A and B did not contain particles).
Resin A: polycarbonate (PC)
Resin B: ethylene-propylene copolymer (EPC)
  Type Y-2045GP, manufactured by Idemitsu Kosan
Then resin A was fed to a vented extruder 1 and resin B was fed to a vented extruder 2. The resins were melted in the respective extruders at 280° C., and were flown into a feed block as shown in FIG. 8 after passing through a gear pump and a filter.

Example 30

The following resin A and resin B were provided (Both of the thermoplastic resins A and B did not contain particles).
Resin A: polycarbonate (PC)
Resin B: poly 4-methylpentene 1 (TPX)
  Type DX820, manufactured by Mitsui Chemicals
Then resin A was fed to a vented extruder 1 and resin B was fed to a vented extruder 2. The resins were melted in the respective extruders at 280° C., and were flown into a feed block as shown in FIG. 8 after passing through a gear pump and a filter.

Example 31

The following resin A and resin B were provided (Both of the thermoplastic resins A and B did not contain particles).
Resin A: norbornene cycloolefin copolymer (COC)
  TOPAS 5013, manufactured by Polyplastics Co., Ltd.
Resin B: poly 4-methylpentene 1 (TPX)
  Type DX820, manufactured by Mitsui Chemicals
Then resin A was fed to a vented extruder 1 and resin B was fed to a vented extruder 2. The resins were melted in the respective extruders at 280° C., and were flown into a feed block as shown in FIG. 8 after passing through a gear pump and a filter.

Example 32

The following resin A and resin B were provided (Both of the thermoplastic resins A and B did not contain particles).
Resin A: polyethylene terephthalate (PET)
Resin B: ethylene-propylene copolymer (EPC)
  Type Y-2045GP, manufactured by Idemitsu Kosan
Then resin A was fed to a vented extruder 1 and resin B was fed to a vented extruder 2. The resins were melted in the respective extruders at 280° C., and were flown into a feed block as shown in FIG. 8 after passing through a gear pump and a filter.

Example 33

The following resin A and resin B were provided (Both of the thermoplastic resins A and B did not contain particles).
Resin A: polymethylmethacrylate (PMMA)
  Sumipex type MGSS, manufactured by Sumitomo Chemical.
Resin B: tetrafluoroethylene-ethylene copolymer
  Composition (tetrafluoroethylene 20 mol %, vinylidene fluoride 80 mol %)
Then resin A was fed to a vented extruder 1 and resin B was fed to a vented extruder 2. The resins were melted in the respective extruders at 240° C., and were flown into a feed block as shown in FIG. 8 after passing through a gear pump and a filter.

TABLE 1

|  | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|
| Composition of Resin A | PMMA | PMMA | PMMA | PMMA | PMMA | PMMA | PMMA | PMMA | PMMA | PMMA | PMMA | PMMA |
| Composition of Resin B | ETFE | ETFE | ETFE | ETFE | ETFE | ETFE | ETFE | ETFE | ETFE | ETFE | ETFE | ETFE |
| Number of Cores | 49 | 149 | 75 | 75 | 24 | 12 | 75 | 75 | 75 | 75 | 75 | 75 |
| Number of Cladding Walls | 50 | 150 | 150 | 150 | 25 | 13 | 150 | 150 | 150 | 150 | 150 | 150 |
| Number of Core Interval Adjusting Portions | 2 | 2 | 76 | 76 | 2 | 2 | 76 | 76 | 76 | 76 | 76 | 76 |
| Number of Slits | 101 | 301 | 301 | 301 | 51 | 27 | 301 | 301 | 301 | 301 | 301 | 301 |
| Width-Enlarging Ratio of Die Passage 1 | 7.5 | 6.1 | 5.0 | 4.4 | 7.8 | 7.7 | 5.0 | 5.0 | 5.0 | 5.0 | 5.0 | — |
| Width-Enlarging Ratio of Die Passage 2 | 1.0 | 1.0 | 1.0 | 1.0 | 1.0 | 1.0 | 0.9 | 0.8 | 1.2 | 1.3 | 5.0 | 5.0 |

TABLE 1-continued

|  | | | | | | | | | | | |
|---|---|---|---|---|---|---|---|---|---|---|---|
| Width-Enlarging Ratio of Die Passage 3 | 7.5 | 6.1 | 5.0 | 4.4 | 7.8 | 7.7 | 5.0 | 5.0 | 5.0 | 5.0 | 5.0 | — |
| Width-Enlarging Ratio of Feedblock | 1.3 | 4.9 | 6.1 | 6.8 | 0.7 | 0.3 | 5.1 | 4.5 | 7.0 | 7.6 | 30.3 | 30.3 |
| Angle (°) of Inclination of Slit Length | 0 | 0 | 0 | 0 | 0 | 0 | 0 | 0 | 0 | 0 | 0 | 0 |
| Ratio of Distance from Inlet of Feedblock Slit to Outlet of Multimanifold Die | 10 | 10 | 10 | 10 | 10 | 10 | 10 | 10 | 10 | 10 | 10 | 10 |

|  | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|
| Composition of Resin A | PMMA | PMMA | MS | MS | PMMA | PMMA | PMMA | PMMA | PEN | PMMA | PMMA/PVDF |
| Composition of Resin B | ETFE | ETFE | ETFE | ETFE | VDF/TFE | VDF/TFE | PVDF | ETFE | PET | PVDF | PVDF |
| Number of Cores | 49 | 74 | 49 | 74 | 49 | 74 | 74 | 74 | 74 | 50 | 150 |
| Number of Cladding Walls | 50 | 150 | 50 | 150 | 50 | 150 | 150 | 150 | 150 | 51 | 151 |
| Number of Core Interval Adjusting Portions | 2 | 77 | 2 | 77 | 2 | 77 | 77 | 77 | 77 | 0 | 0 |
| Number of Slits | 101 | 301 | 101 | 301 | 101 | 301 | 301 | 301 | 301 | 101 | 301 |
| Width-Enlarging Ratio of Die Passage 1 | — | — | — | — | — | — | — | — | — | — | — |
| Width-Enlarging Ratio of Die Passage 2 | 1 | 1 | 1 | 1 | 1 | 1 | 1 | 1 | 1 | 1 | 1 |
| Width-Enlarging Ratio of Die Passage 3 | — | — | — | — | — | — | — | — | — | — | — |
| Width-Enlarging Ratio of Feedblock | 1.3 | 1.3 | 1.3 | 1.3 | 1.3 | 1.3 | 1.3 | 1.3 | 1.3 | 1.3 | 1.3 |
| Angle (°) of Inclination of Slit Length | 0 | 0 | 0 | 0 | 0 | 0 | 0 | 0 | 0 | 0 | 0 |
| Ratio of Distance from Inlet of Feedblock Slit to Outlet of Multimanifold Die | 10 | 10 | 10 | 10 | 10 | 10 | 10 | 10 | 10 | 10 | 10 |

|  | Example 22 | Example 23 | Example 24 | Example 25 | Example 26 | Comparative Example 3 | Example 27 | Example 28 |
|---|---|---|---|---|---|---|---|---|
| Composition of Resin A | PMMA | MS | PMMA | PMMA | PMMA | PMMA | PMMA | PMMA |
| Composition of Resin B | PVDF | PVDF | PVDF | ETFE | ETFE | ETFE | PVDF | PVDF |
| Number of Cores | 50 | 50 | 50 | 150 | 150 | 50 | 50 | 50 |
| Number of Cladding Walls | 51 | 51 | 51 | 151 | 151 | 51 | 51 | 51 |
| Number of Core Interval Adjusting Portions | 2 | 2 | 2 | 77 | 77 | 0 | 0 | 0 |
| Number of Slits | 101 | 101 | 101 | 301 | 301 | 101 | 101 | 101 |
| Width-Enlarging Ratio of Die Passage 1 | 7.5 | 7.5 | 7.5 | 7.5 | 7.5 | 7.5 | 7.5 | 7.5 |
| Width-Enlarging Ratio of Die Passage 2 | 0.8 | 0.8 | 1.1 | 0.9 | 1.2 | 0.5 | 1.8 | 0.8 |
| Width-Enlarging Ratio of Die Passage 3 | 7.5 | 7.5 | 7.5 | 7.5 | 7.5 | 7.5 | 7.5 | 7.5 |
| Width-Enlarging Ratio of Feedblock | 1.3 | 1.3 | 1.3 | 2.0 | 2.0 | 1.4 | 2.0 | 0.8 |
| Angle (°) of Inclination of Slit Length | 3 | 4 | 5 | 5 | 5 | 3 | 0 | 2 |
| Ratio of Distance from Inlet of Feedblock Slit to Outlet of Multimanifold Die | 7 | 7 | 10 | 7 | 20 | 40 | 20 | 30 |

|  | Example 29 | Example 30 | Example 31 | Example 32 | Example 33 |
|---|---|---|---|---|---|
| Composition of Resin A | PC | PC | COP | PET | PMMA |
| Composition of Resin B | EPC | TPX | TPX | EPC | VDF/TFE |
| Number of Cores | 49 | 49 | 49 | 49 | 49 |
| Number of Cladding Walls | 50 | 50 | 50 | 50 | 50 |
| Number of Core Interval Adjusting Portions | 2 | 2 | 2 | 2 | 2 |
| Number of Slits | 101 | 101 | 101 | 101 | 101 |
| Width-Enlarging Ratio of Die Passage 1 | 7.5 | 7.5 | 7.5 | 7.5 | 7.5 |
| Width-Enlarging Ratio of Die Passage 2 | 1 | 1 | 1 | 1 | 1 |

TABLE 1-continued

|  |  |  |  |  |  |
|---|---|---|---|---|---|
| Width-Enlarging Ratio of Die Passage 3 | 7.5 | 7.5 | 7.5 | 7.5 | 7.5 |
| Width-Enlarging Ratio of Feedblock | 1.3 | 1.3 | 1.3 | 1.3 | 1.3 |
| Angle (°) of Inclination of Slit Length | 0 | 0 | 0 | 0 | 0 |
| Ratio of Distance from Inlet of Feedblock Slit to Outlet of Multimanifold Die | 10 | 10 | 10 | 10 | 10 |

TABLE 2

|  |  | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|---|
| Average Core Diameter | μm | 1000 | 500 | 100 | 50 | 1000 | 1000 | 100 | 100 | 100 | 100 | 100 | 100 |
| Average Cladding Wall Diameter | μm | 500 | 50 | 100 | 50 | 500 | 500 | 100 | 100 | 100 | 100 | 100 | 100 |
| Average Film Thickness | μm | 1040 | 540 | 140 | 90 | 1040 | 1040 | 140 | 140 | 140 | 140 | 140 | 140 |
| We1/Wc | — | 1 | 0.99 | 0.99 | 0.99 | 0.99 | 1 | 0.9 | 0.85 | 1.05 | 1.1 | 0.79 | 0.75 |
| We2/Wc | — | 1 | 0.99 | 0.99 | 0.99 | 0.99 | 1 | 0.91 | 0.84 | 1.06 | 1.11 | 0.78 | 0.76 |
| Te1/Tc | — | 1 | 1 | 1 | 1 | 1 | 1 | 1.05 | 1.1 | 0.95 | 0.9 | 1.2 | 1.25 |
| Te2/Tc | — | 1 | 1 | 1 | 1 | 1 | 1 | 1.05 | 1.1 | 0.94 | 0.89 | 1.21 | 1.23 |
| Variation in Core Diameters | (%) | 0.1 | 1.5 | 2.2 | 3.5 | 1.3 | 0.3 | 5.1 | 7.5 | 8 | 11 | 22 | 26 |
| Difference in Propagation Loss | — | ◎ | ◎ | ◎ | ◎ | ◎ | ◎ | ○ | ○ | ○ | Δ | X | X |
| Maximum Number of Consecutive Cores Satisfying Formula (5) | cores | — | — | — | — | — | — | — | — | — | — | — | — |
| Variation in Cross-sectional Areas of Cores in Machine Direction | % | — | — | — | — | — | — | — | — | — | — | — | — |
| Width of Obtained Film | mm | 50 | 50 | 50 | 50 | 50 | 50 | 50 | 50 | 50 | 50 | 50 | 50 |
| Heat Shrinkage Ratio | % | — | — | — | — | — | — | — | — | — | — | — | — |
| Location of Concavity Surface | — | one side | one side | one side | one side | one side | one side | one side | one side | one side | one side | one side | one side |
| Depth of Concavity Surface | μm | 375 | 230 | 23 | 9 | 380 | 355 | 21 | 24 | 15 | 11 | 6 | 4 |
| Core/Clad Area Ratio | — | 2.2 | 1.1 | 1 | 1.1 | 2.2 | 2.2 | 1.1 | 1.1 | 1.1 | 1 | 1 | 0.95 |
| Length in Transverse Direction of Film of Core Interval Adjusting Portions at Both Ends | mm | — | — | — | — | — | — | — | — | — | — | — | — |
| Haze Value | % | — | — | — | — | — | — | — | — | — | — | — | — |
| NA | — | 0.56 | 0.56 | 0.56 | 0.56 | 0.56 | 0.56 | 0.56 | 0.56 | 0.56 | 0.56 | 0.56 | 0.56 |
| Melt Viscosity of Cores | Pa·S | 512 | 512 | 512 | 512 | 512 | 512 | 512 | 512 | 512 | 512 | 512 | 512 |
| Melt Viscosity of Claddings | Pa·S | 1184 | 1184 | 1184 | 1184 | 1184 | 1184 | 1184 | 1184 | 1184 | 1184 | 1184 | 1184 |
| Evaluation of Self-supporting Property | — | ○ | Δ | Δ | Δ | ○ | ○ | Δ | Δ | Δ | Δ | Δ | X |
| Variation in Core Intervals | % | 1.2 | 2.2 | 2 | 3.3 | 1 | 0.8 | 5.4 | 5.8 | 7.2 | 8 | 28 | 31 |
| Propagation Loss | — | ◎ | ◎ | ◎ | ◎ | ◎ | ◎ | ○ | ○ | ○ | Δ | Δ | Δ |

|  |  | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| Average Core Diameter | μm | 1000 | 100 | 1000 | 100 | 980 | 100 | 100 | 100 | 100 | 1000 | 150 |
| Average Claddingding Wall Diameter | μm | 500 | 150 | 500 | 150 | 510 | 150 | 150 | 150 | 150 | 2500 | 450 |
| Average Film Thickness | μm | 1100 | 110 | 1100 | 110 | 1100 | 110 | 110 | 120 | 110 | 1100 | 120 |
| We1/Wc | — | 0.95 | 0.92 | 0.95 | 0.92 | 1 | 0.99 | 0.83 | 0.88 | 0.99 | 0.88 | 0.8 |
| We2/Wc | — | 0.95 | 0.92 | 0.96 | 0.91 | 1 | 0.99 | 0.85 | 0.9 | 0.99 | 0.85 | 0.8 |
| Te1/Tc | — | 1.05 | 1.05 | 1.03 | 1.03 | 1 | 1 | 1.1 | 1.07 | 0.98 | 1.2 | 1.15 |
| Te2/Tc | — | 1.05 | 1.05 | 1.03 | 1.05 | 1 | 1 | 1.1 | 1.06 | 0.98 | 1.2 | 1.12 |
| Variation in Core Diameters | (%) | 0.11 | 1.8 | 2.6 | 4 | 0.07 | 0.08 | 20 | 13 | 2 | 21 | 27 |
| Difference in Propagation Loss | — | ◎ | ◎ | ◎ | ◎ | ◎ | ◎ | Δ | Δ | ◎ | Δ | ○ |
| Maximum Number of Consecutive Cores Satisfying Formula (5) | cores | — | — | — | — | — | — | — | — | — | — | — |
| Variation in Cross-sectional Areas of Cores in Machine Direction | % | — | — | — | — | — | — | — | — | — | — | — |
| Width of Obtained Film | mm | 154 | 154 | 154 | 154 | 154 | 154 | 154 | 95 | 154 | 90 | 90 |
| Heat Shrinkage Ratio | % | — | — | — | — | — | — | — | — | — | — | — |
| Location of Concavity Surface | — | one side | one side | one side | both sides | one side | one side | one side | both sides | one side | one side | one side |

TABLE 2-continued

| | | | | | | | | | | | |
|---|---|---|---|---|---|---|---|---|---|---|---|
| Depth of Concavity Surface | μm | 85 | 11 | 80 | 10 | 190 | 20 | 13 | 15 | 7 | 100 | 10 |
| Core/Clad Area Ratio | — | 2.2 | 3.1 | 2.4 | 3.2 | 2.4 | 3.5 | 1.38 | 0.52 | 4.5 | 0.28 | 0.3 |
| Length in Transverse Direction of Film of Core Interval Adjusting Portions at Both Ends | mm | 40 | 10 | 40 | 10 | 40 | 11 | 2 | 10 | 10 | — | — |
| Haze Value | % | 3.2 | 4.3 | 4.1 | 5.2 | 17.9 | 10.2 | 12.5 | 6.5 | 3 | 22 | 24.6 |
| NA | — | 0.51 | 0.51 | 0.64 | 0.64 | 0.51 | 0.51 | 0.45 | 0.51 | 0.47 | 0.45 | 0.41 |
| Melt Viscosity of Cores | Pa·S | 1220 | 1220 | 1284 | 1284 | 512 | 512 | 256 | 831 | 621 | 1220 | 854 |
| Melt Viscosity of Claddings | Pa·S | 1184 | 1184 | 1184 | 1184 | 471 | 471 | 937 | 1581 | 303 | 937 | 937 |
| Evaluation of Self-supporting Property | — | ○ | ○ | ○ | ○ | ○ | ○ | Δ | Δ | ○ | X | X |
| Variation in Core Intervals | % | 22 | 16 | 28 | 15 | 10 | 6 | 86 | 63 | 5 | 258 | 222 |
| Propagation Loss | — | ◎ | ◎ | ○ | ○ | ◎ | ◎ | Δ | Δ | Δ | X | X |

| | | Example 22 | Example 23 | Example 24 | Example 25 | Example 26 | Comparative Example 3 | Example 27 | Example 28 |
|---|---|---|---|---|---|---|---|---|---|
| Average Core Diameter | μm | 600 | 620 | 630 | 100 | 100 | 850 | 800 | 100 |
| Average Cladding Wall Diameter | μm | 640 | 650 | 650 | 140 | 150 | 1350 | 1340 | 2505 |
| Average Film Thickness | μm | 800 | 820 | 850 | 120 | 120 | 950 | 890 | 120 |
| We1/Wc | — | 1 | 1 | 0.99 | 0.98 | 0.99 | 0.78 | 0.95 | 0.9 |
| We2/Wc | — | 1 | 1 | 0.99 | 0.98 | 0.99 | 0.78 | 0.96 | 0.91 |
| Te1/Tc | — | 1 | 1 | 1 | 0.99 | 1 | 0.79 | 0.92 | 1.01 |
| Te2/Tc | — | 1 | 1 | 1 | 0.99 | 1 | 0.79 | 0.92 | 1.01 |
| Variation in Core Diameters | (%) | 0.07 | 0.1 | 0.15 | 5.5 | 9 | 33 | 18 | 20 |
| Difference in Propagation Loss | — | ◎ | ◎ | ◎ | ○ | ○ | X | Δ | Δ |
| Maximum Number of Consecutive Cores Satisfying Formula (5) | cores | 29 | 8 | 31 | 55 | 19 | 8 | 2 | 3 |
| Variation in Cross-sectional Areas of Cores in Machine Direction | % | 0.8 | 3.8 | 2.5 | 5.5 | 5.1 | 5.3 | 3.9 | 5.5 |
| Width of Obtained Film | mm | 100 | 105 | 99 | 154 | 153 | 112 | 111 | 130 |
| Heat Shrinkage Ratio | % | 0.95 | 1.01 | 1.12 | 1.54 | 0.98 | 5.55 | 1.02 | 2.03 |
| Location of Concavity Surface | — | one side | both sides | one side | one side | one side | both sides | one side | one side |
| Depth of Concavity Surface | μm | 56 | 15 | 102 | 9 | 18 | 8 | 22 | 23 |
| Core/Clad Area Ratio | — | 2.3 | 2.3 | 2.3 | 2.06 | 2.06 | 0.6 | 0.4 | 0.1 |
| Length in Transverse Direction of Film of Core Interval Adjusting Portions at Both Ends | mm | — | — | — | — | — | — | — | — |
| Haze Value | % | — | — | — | — | — | — | — | — |
| NA | — | 0.45 | 0.59 | 0.45 | 0.56 | 0.56 | 0.56 | 0.45 | 0.45 |
| Melt Viscosity of Cores | Pa·S | 512 | 948 | 831 | 1755 | 1755 | 256 | 1755 | 1755 |
| Melt Viscosity of Claddings | Pa·S | 520 | 520 | 520 | 2212 | 1184 | 2212 | 520 | 520 |
| Evaluation of Self-supporting Property | — | ○ | ○ | ○ | ○ | ○ | Δ | X | X |
| Variation in Core Intervals | % | 1.2 | 10.8 | 2 | 2.1 | 11.1 | 15.6 | 11.3 | 18.3 |
| Propagation Loss | — | ◎ | ○ | ◎ | ◎ | Δ | X | X | X |

| | | Example 29 | Example 30 | Example 31 | Example 32 | Example 33 |
|---|---|---|---|---|---|---|
| Average Core Diameter | μm | 600 | 605 | 610 | 600 | 605 |
| Average Cladding Wall Diameter | μm | 580 | 580 | 590 | 580 | 580 |
| Average Film Thickness | μm | 650 | 660 | 680 | 650 | 660 |
| We1/Wc | — | 0.99 | 0.99 | 1 | 1 | 1 |
| We2/Wc | — | 0.99 | 0.99 | 1 | 1 | 1 |
| Te1/Tc | — | 1 | 1 | 1 | 1 | 1 |
| Te2/Tc | — | 1 | 1 | 1 | 1 | 1 |
| Variation in Core Diameters | (%) | 1.1 | 0.9 | 0.1 | 0.1 | 0.1 |
| Difference in Propagation Loss | — | ◎ | ◎ | ◎ | ◎ | ◎ |
| Maximum Number of Consecutive Cores Satisfying Formula (1) | cores | — | — | — | — | — |
| Variation in Cross-sectional Areas in Machine Direction | % | — | — | — | — | — |
| Width | mm | 50 | 50 | 50 | 50 | 50 |
| Heat Shrinkage Ratio | % | 0.25 | 0.33 | 0.3 | 2.5 | 0.5 |
| Location of Concavity Surface | — | one side | one side | one side | one side | one side |
| Depth of Concavity Surface | μm | 43 | 23 | 22 | 35 | 150 |
| Core/Clad Area Ratio | — | 2 | 2 | 2 | 1.9 | 2.3 |
| Length in Transverse Direction of Film of Core Interval Adjusting Portions at Both Ends | mm | 30 | 30 | 30 | 30 | 30 |
| Haze Value | % | — | — | — | — | — |
| NA | — | 0.47 | 0.59 | 0.44 | 0.46 | 0.51 |
| Melt Viscosity of Cores | Pa·S | 305 | 305 | 280 | 220 | 512 |
| Melt Viscosity of Claddings | Pa·S | 120 | 131 | 131 | 120 | 471 |
| Evaluation of Self-supporting Property | — | ○ | ○ | ○ | ○ | ○ |
| Variation in Core Intervals | % | 2.2 | 1.5 | 1 | 1 | 1.1 |
| Propagation Loss | — | Δ | Δ | Δ | Δ | ◎ |

TABLE 3

| resin B | Type | Tm (° C.) | ΔHm (J/g) |
|---|---|---|---|
| Examples 11-14 | RP4020 | 171 | 14 |
| Examples 15, 16 and 33 | — | 128 | 34 |
| Examples 17 and 20 | #T850 | 177 | 51 |
| Example 18 | LM730AP | 220 | 22.5 |
| Examples 27 and 28 | T10 | 175 | 54 |

The present invention may be applied, for example, to uses such as display parts, solar cell parts, information communication parts, ornamental parts, illumination parts and the like, especially, to optical waveguides such as those used for short, middle and long distances in inter-apparatus communication and intra-apparatus communication.

The invention claimed is:

1. An optical waveguide film having a cross-sectional structure wherein claddings composed of a thermoplastic resin B and dispersions (cores) composed of a thermoplastic resin A extend in a machine direction of the film and are arrayed in a transverse direction of the film, said optical waveguide film comprising not less than 8 cores, said optical wave guide film further comprising one or more core interval adjusting portions composed of the thermoplastic resin A and having a different diameter from the core diameter and a length in the transverse direction of the film of not less than 10 mm at both ends in the transverse direction of the film, and extending along the machine direction of the film in the same manner as the cores, diameters (We1, We2) of cores located at both ends in the transverse direction of the film and a diameter (Wc) of a core in a central portion in the transverse direction of the film satisfying the following Formulae (1) and (2), said optical waveguide film comprising a continuous cladding layer at at least one side thereof, thicknesses of cladding layers (Te1, Te2) at both ends thereof in the transverse direction of the film and a thickness (Tc) of the cladding layer in the central portion in the transverse direction of the film satisfying the following Formulae (3) and (4) and a core/clad area ratio in a cross section being not less than 0.5:

$0.8<We1/Wc<1.2$      Formula (1)

$0.8<We2/Wc<1.2$      Formula (2)

$0.8<Te1/Tc<1.2$      Formula (3)

$0.8<Te2/Tc<1.2$      Formula (4).

2. The optical waveguide film according to claim 1, wherein variation in core diameter is not less than 0.001% to not more than 20%.

3. The optical waveguide film according to claim 1, wherein at least 4 consecutive adjacent cores satisfying the relationship between a cross-sectional area (Ac) of a core located at the central portion in the transverse direction of the film and a cross-sectional area (A) of an arbitrary core arrayed in the transverse direction of the film defined in Formula (5) below exist.

$0.8<A/Ac<1.2$      Formula (5).

4. The optical waveguide film according to claim 1, wherein variation in a cross-sectional area along the machine direction of the film of the cores is not more than 5%.

5. The optical waveguide film according to claim 1, wherein variation in core intervals is not more than 30%.

6. The optical waveguide film according to claim 1, wherein a concavity and a convexity with a depth of not less than 10μm exist in at least one surface of the film, said concavity being formed at the cladding portions between the cores, and said concavity extends toward the machine direction of the film.

7. The optical waveguide film according to claim 1, wherein the cores comprise polymethylmethacrylate as a major component and the claddings comprise a thermoplastic resin having fluorine group as a major component.

8. The optical waveguide film according to claim 7, wherein the thermoplastic resin having fluorine groups is a tetrafluoroethylene-ethylene copolymer.

9. The optical waveguide film according to claim 1, which has a haze value of not more than 5%.

10. The optical waveguide film according to claim 1, which has an NA of not less than 0.5.

11. The optical waveguide film according to claim 1, wherein melt viscosities of the cores and of the claddings at a film-molding temperature simultaneously satisfy the relationship defined by the following Formulae (6) and (7):

Melt Viscosity of Cores>Melt Viscosity of Claddings      Formula (6)

Melt Viscosity of Claddings<1000(Pa·s)      Formula (7).

12. The optical waveguide film according to claim 1, wherein a heat shrinkage ratio in the machine direction of the film after heat treatment at 100° C. for 24 hours is not more than 5%.

13. The optical waveguide film according to claim 1, which is used after being cut off along a machine direction of the film - thickness direction cross section.

14. An optical module comprising the optical waveguide film according to claim 1.

15. An illumination apparatus comprising the optical waveguide film according to claim 1.

16. A communication apparatus comprising the optical waveguide film according to claim 1.

17. A display apparatus comprising the optical waveguide film according to claim 1.

18. A light guide with a connector comprising the optical waveguide film according to claim 1.

* * * * *